US011995263B1

(12) United States Patent
Lin et al.

(10) Patent No.: US 11,995,263 B1
(45) Date of Patent: May 28, 2024

(54) TOUCH SCREEN WITH PERIMETER TOUCH ELECTRODES

(71) Applicant: Apple Inc., Cupertino, CA (US)

(72) Inventors: Hung Sheng Lin, San Jose, CA (US); Jun Qi, Cupertino, CA (US); Hao-Lin Chiu, Campbell, CA (US); Sai-Chang Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/033,236

(22) Filed: Sep. 25, 2020

Related U.S. Application Data

(60) Provisional application No. 62/906,700, filed on Sep. 26, 2019.

(51) Int. Cl.
*G06F 3/041* (2006.01)
*G06F 1/16* (2006.01)
*G06F 3/044* (2006.01)

(52) U.S. Cl.
CPC ........ *G06F 3/04166* (2019.05); *G06F 1/1643* (2013.01); *G06F 3/0412* (2013.01); *G06F 3/0445* (2019.05); *G06F 3/0448* (2019.05)

(58) Field of Classification Search
CPC ............................ G06F 3/04166; G06F 3/0445
See application file for complete search history.

(56) References Cited

U.S. PATENT DOCUMENTS

| | | | |
|---|---|---|---|
| 2006/0197750 A1 | 9/2006 | Kerr et al. | |
| 2008/0279498 A1* | 11/2008 | Sampsell | G02B 26/001 385/8 |
| 2013/0229335 A1* | 9/2013 | Whitman | G06F 3/02 345/156 |
| 2017/0102872 A1* | 4/2017 | Kim | G06F 1/1626 |
| 2017/0178838 A1* | 6/2017 | Ohira | H01H 13/70 |
| 2018/0239455 A1* | 8/2018 | Jia | G06K 9/00013 |
| 2019/0018588 A1 | 1/2019 | Debates et al. | |
| 2019/0163003 A1 | 5/2019 | Kim et al. | |
| 2020/0241700 A1* | 7/2020 | Bruwer | G06F 3/044 |
| 2020/0272011 A1* | 8/2020 | Yoshida | G06F 3/0412 |
| 2020/0272012 A1* | 8/2020 | Yoshida | G02F 1/136286 |
| 2020/0301517 A1* | 9/2020 | Monson | A63F 13/214 |
| 2021/0089155 A1* | 3/2021 | Lee | H01L 27/323 |

* cited by examiner

*Primary Examiner* — Chun-Nan Lin
(74) *Attorney, Agent, or Firm* — Kubota & Basol LLP

(57) ABSTRACT

A touch screen may be formed from a display and perimeter touch electrodes. Touches detected at one or more of the perimeter touch electrodes can be imputed to touch on a region of the display of the touch screen adjacent to the perimeter touch electrodes. In some examples, the perimeter touch electrodes comprise segmented frit metal arranged around the perimeter of the display (e.g., frit metal used to encapsulate the display). In some examples, the perimeter touch electrodes can be coupled to one or more touch sensing circuits via switching circuitry. In some examples, the switching circuitry can be operated based on control signals shared with the display circuitry.

21 Claims, 13 Drawing Sheets

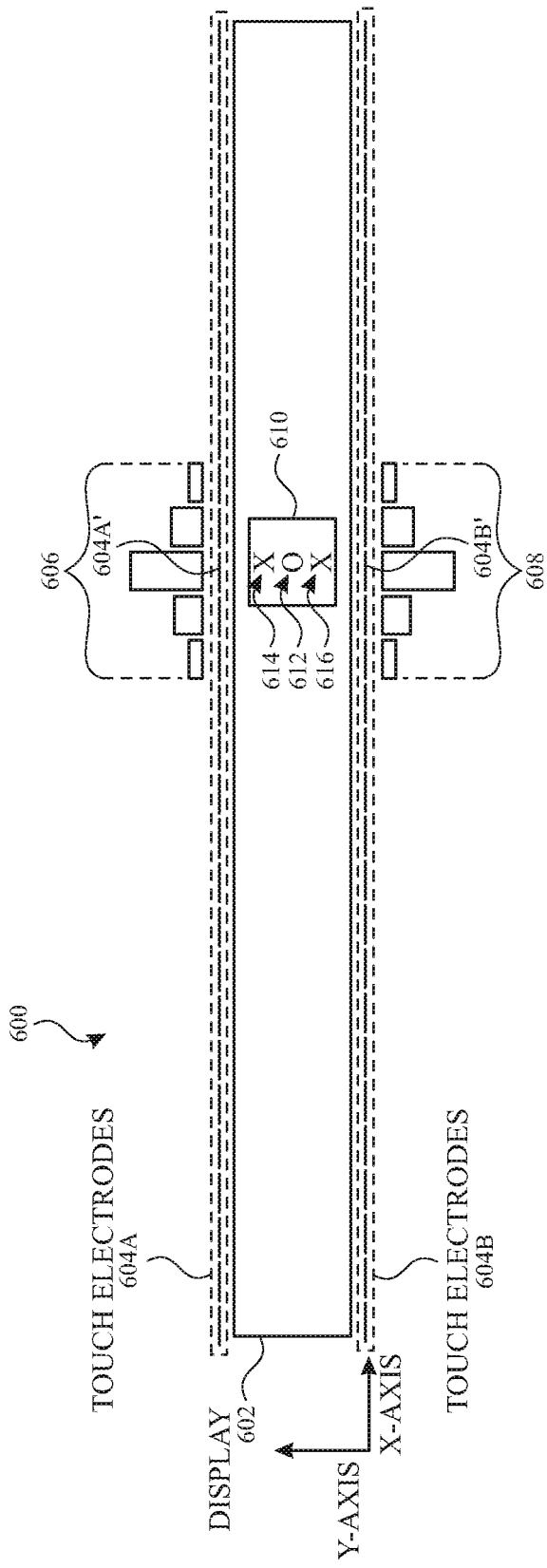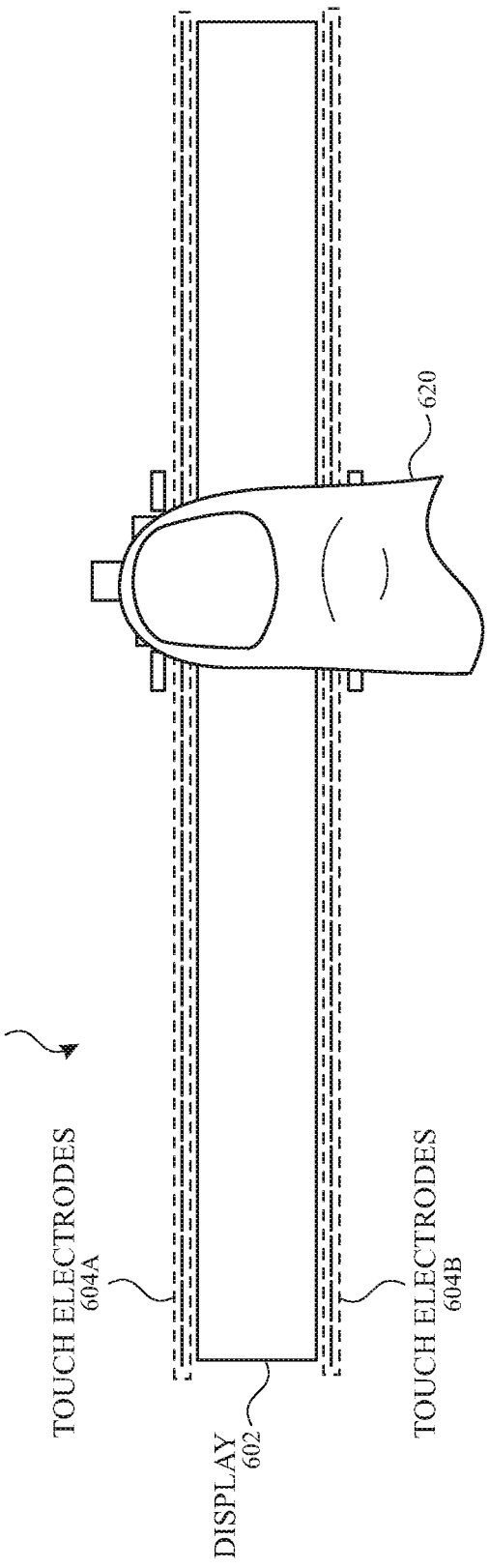

TOUCH SCREEN WITH PERIMETER TOUCH ELECTRODES

CROSS REFERENCE TO RELATED APPLICATIONS

This application claims the benefit under 35 U.S.C. 119(e) of U.S. Provisional Patent Application No. 62/906,700, filed Sep. 26, 2019, the content of which is incorporated herein by reference in its entirety for all purposes.

FIELD OF THE DISCLOSURE

This relates generally to touch screens, and more particularly, to touch screens with perimeter touch electrodes.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates to touch screens with perimeter touch electrodes. Touches detected at one or more of the perimeter touch electrodes can be imputed to touch on a region of the display of the touch screen adjacent to the perimeter touch electrodes. In some examples, the perimeter touch electrodes comprise segmented frit metal arranged around the perimeter of the display (e.g., frit metal used to encapsulate the display). In some examples, the perimeter touch electrodes can be coupled to one or more touch sensing circuits via switching circuitry. In some examples, the switching circuitry can be operated based on control signals shared with the display circuitry.

BRIEF DESCRIPTION OF THE DRAWINGS

FIGS. 6A-6B illustrate an example touch screen including perimeter touch electrodes according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch screens with perimeter touch electrodes (e.g., rather than touch electrodes overlaid on the display). Touches detected at one or more of the perimeter touch electrodes can be imputed to touch on a region of the display of the touch screen adjacent to the perimeter touch electrodes. In some examples, the perimeter touch electrodes comprise segmented frit metal arranged around the perimeter of the display (e.g., frit metal used to encapsulate the display). In some examples, the perimeter touch electrodes can be coupled to one or more touch sensing circuits via switching circuitry. In some examples, the switching circuitry can be operated based on control signals shared with the display circuitry.

Figure 1:
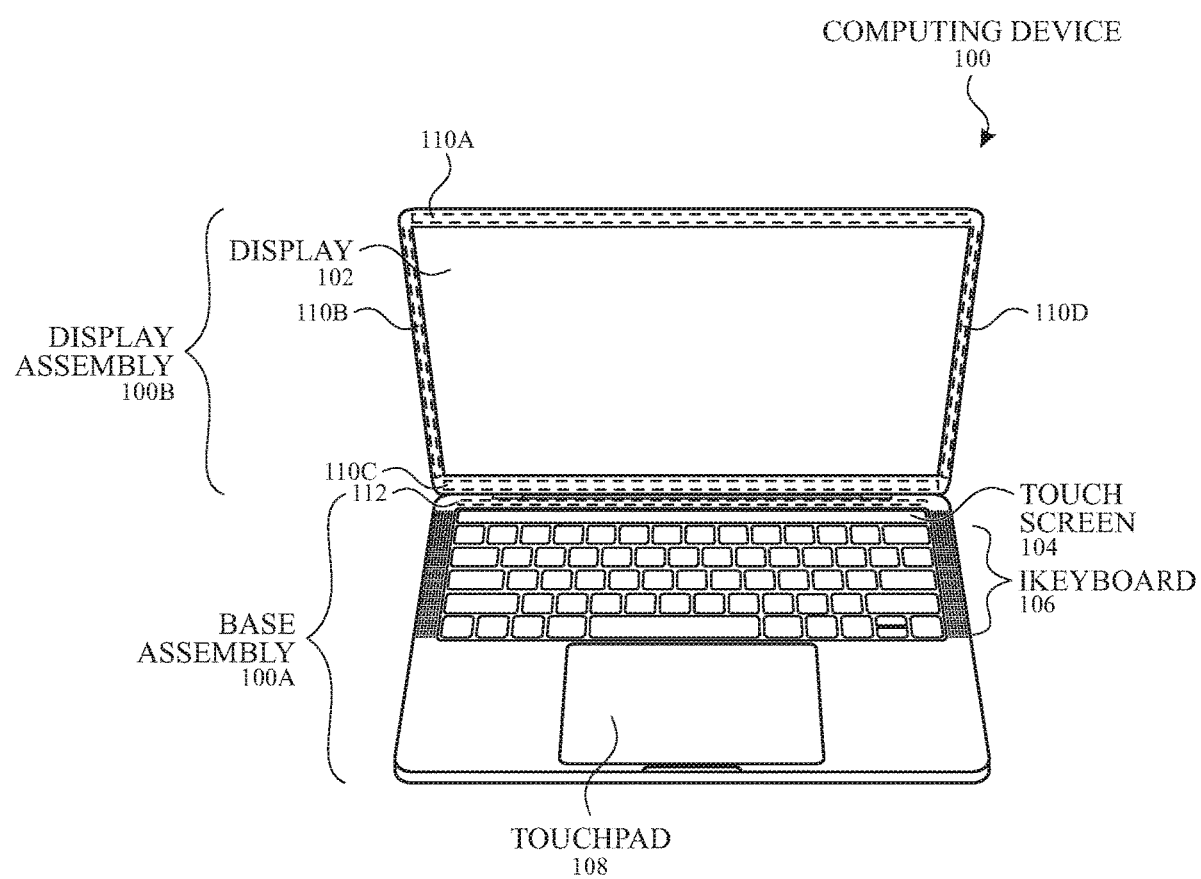
FIG. 1 illustrates an example system that can include a touch screen with perimeter touch electrodes according to examples of the disclosure.

FIG. 1 illustrates an example system that can include a touch screen with perimeter touch electrodes according to examples of the disclosure. FIG. 1 illustrates an example computing device 100 (e.g., a laptop personal computer) that includes one or more displays, one or more touch sensor panels, and/or one or more touch screens. For example, computing device 100 can include a display 102, a touch screen 104 and a touch pad 108. In some examples, touch screen 104 can be formed of partially or fully transparent or non-transparent touch electrodes (e.g., made of materials such as Indium Tin Oxide (ITO)), overlaid on a display. In some examples, as described herein, touch screen 104 can be formed of touch electrodes (e.g., partially or fully transparent or opaque) disposed on a perimeter of the display of touch screen 104. Touches detected on the perimeter of the display can correspond to touches on the display, as described herein, to render the touch electrodes and display together into touch screen 104. In some examples, computing device 100 can be the MacBook Pro® from Apple Inc. of Cupertino, California, and touch screen 104 can be the Touch Bar™.

Computing device 100 can also include a keyboard 106 including mechanical keys. In some examples, as illustrated, the computing device can include a base assembly 100A and a display assembly 100B. Base assembly 100A and display assembly 100B can be coupled via a hinge, in some examples. In some examples, keyboard 108 and touch screen 104 can be integrated into base assembly 100A, and display 102 can be integrated into display assembly 100B.

In some examples, display 102 can include one or more perimeter touch electrodes in one or more touch sensor panels 110A-110D. For example, each of touch sensor panels 110A-D can include one or more touch electrodes. Each of touch sensor panels 110A-110D can allow display 102 to operate as a partial touch screen along the respective edge of display 102 proximate to a respective touch sensor panel. For example, a touch detected at touch sensor panel 110C can correspond to touches on display 102 (the edge portion of the display), and can be used, for example, to activate a user interface element displayed on the bottom edge of display 102. In some examples, a touch sensor panel 112 can be disposed on the base assembly 100A proximate to display 102 to enable similar functionality (imputing touch detected at touch sensor panel 112 to touch on the display) when a user is contacting the bottom portion of display 102.

It is understood that a touch screen with perimeter touch electrodes can be implemented in other devices as well. For example, a touch screen with perimeter touch electrodes can be implemented in a keyboard device accessory or other accessory for a computing device (e.g., base assembly 100A without display assembly 100B). For example, a touch screen similar to touch screen 104 can be implemented in a separate device (e.g., Magic Keyboard™, or Magic Trackpad™ or Magic Mouse™ of Apple Inc.). In some examples, a touch screen with perimeter touch electrodes according to examples of the disclosure can be implemented in other computing devices (e.g., a mobile telephone, tablet computing device, digital media player, desktop computer, wearable device, etc.).

In some examples, touch sensor panels or touch screens can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch sensor panel or touch screen can include a plurality of individual touch electrodes, each touch electrode identifying or representing a unique location (e.g., a touch node) at which touch or proximity is to be sensed, and each touch node electrode being electrically isolated from the other touch node electrodes in the touch screen/panel. It is understood that in some examples, the touch node electrodes of the touch screen/panel can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and/or columns can be detected, similar to above. In some examples, a touch screen/panel can be multi-touch, single touch, projection scan, full-imaging multi-touch, capacitive touch, etc.

In some examples, touch sensor panels or touch screens can be based on mutual capacitance. A mutual capacitance based touch system can include electrodes arranged as drive and sense lines (e.g., as described below with reference to FIG. 4A) that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch sensor panels or touch screens can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 7:
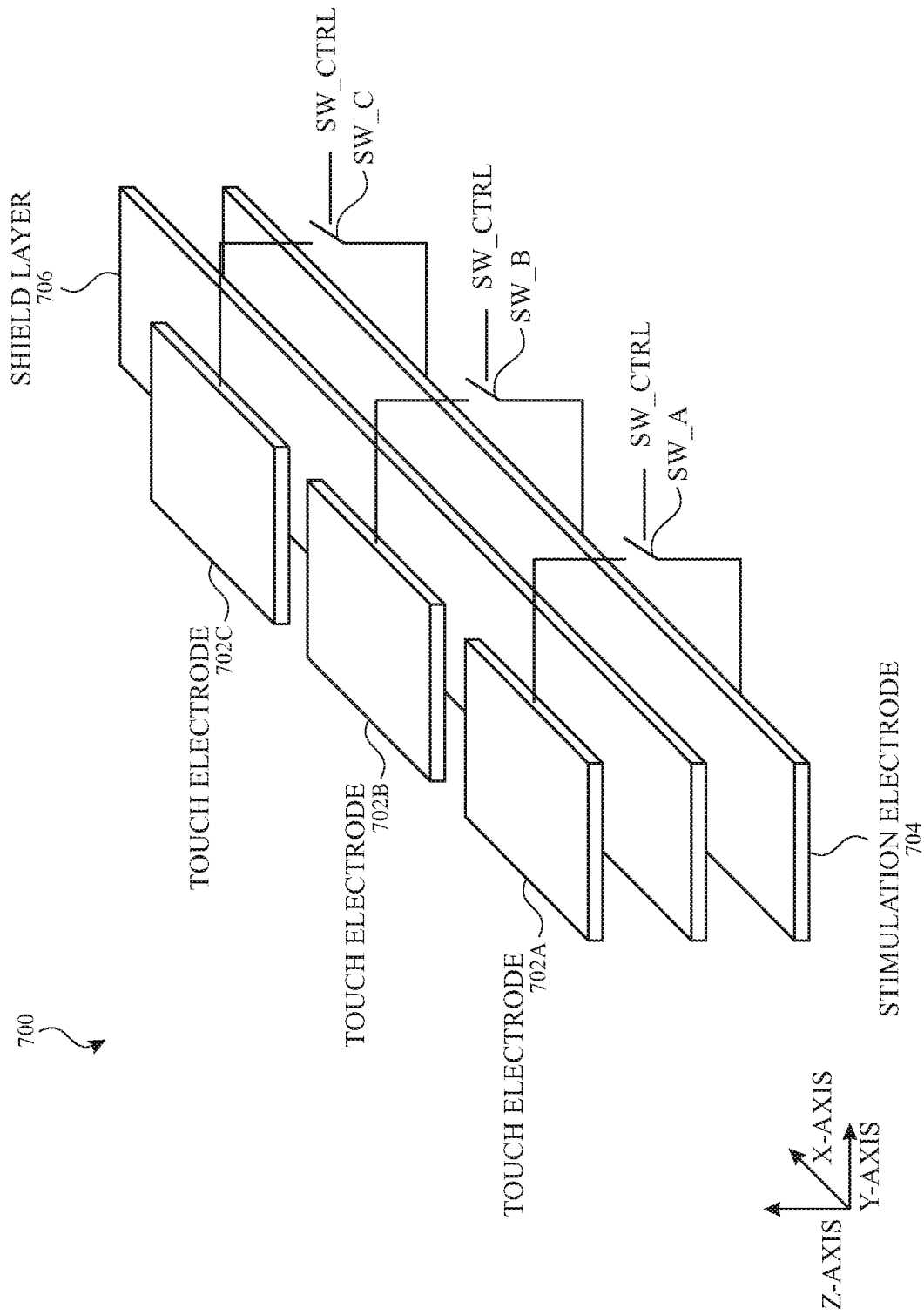
FIG. 7 illustrates an example configuration for touch electrodes and switching circuitry according to examples of the disclosure.
Figure 10:
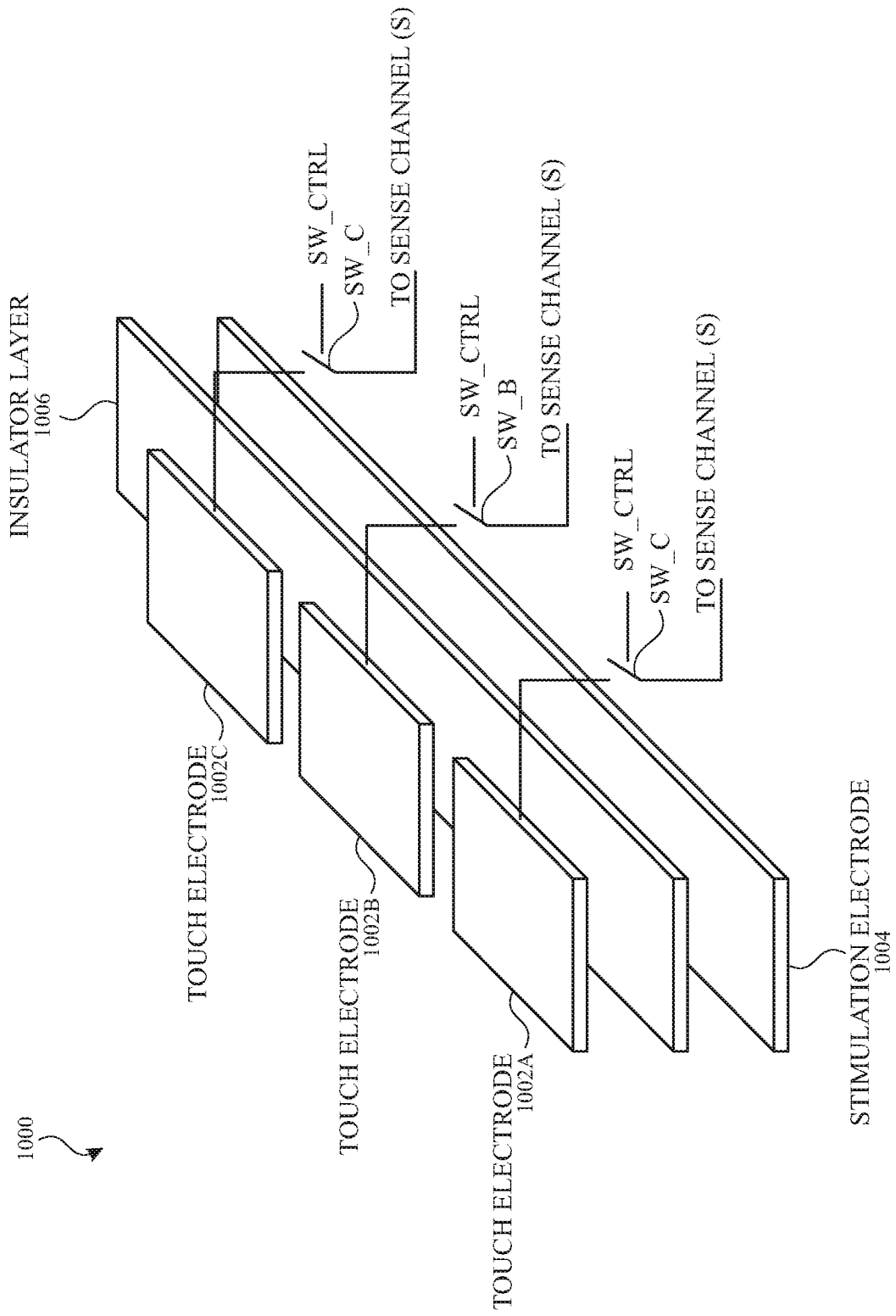
FIG. 10 illustrates an example configuration for touch electrodes and optionally switching circuitry according to examples of the disclosure.

As described herein, in some examples, touch electrodes can be disposed on the perimeter (e.g., one or more sides) of the display (e.g., as illustrated in FIGS. 7 and 10) rather than overlaid over the display. Touch detection using the perimeter touch electrodes can be based on mutual and/or self-capacitance. The display and perimeter touch electrodes can function as a touch screen (e.g., even without the lack of touch electrodes overlapping the display area).

Figure 2:
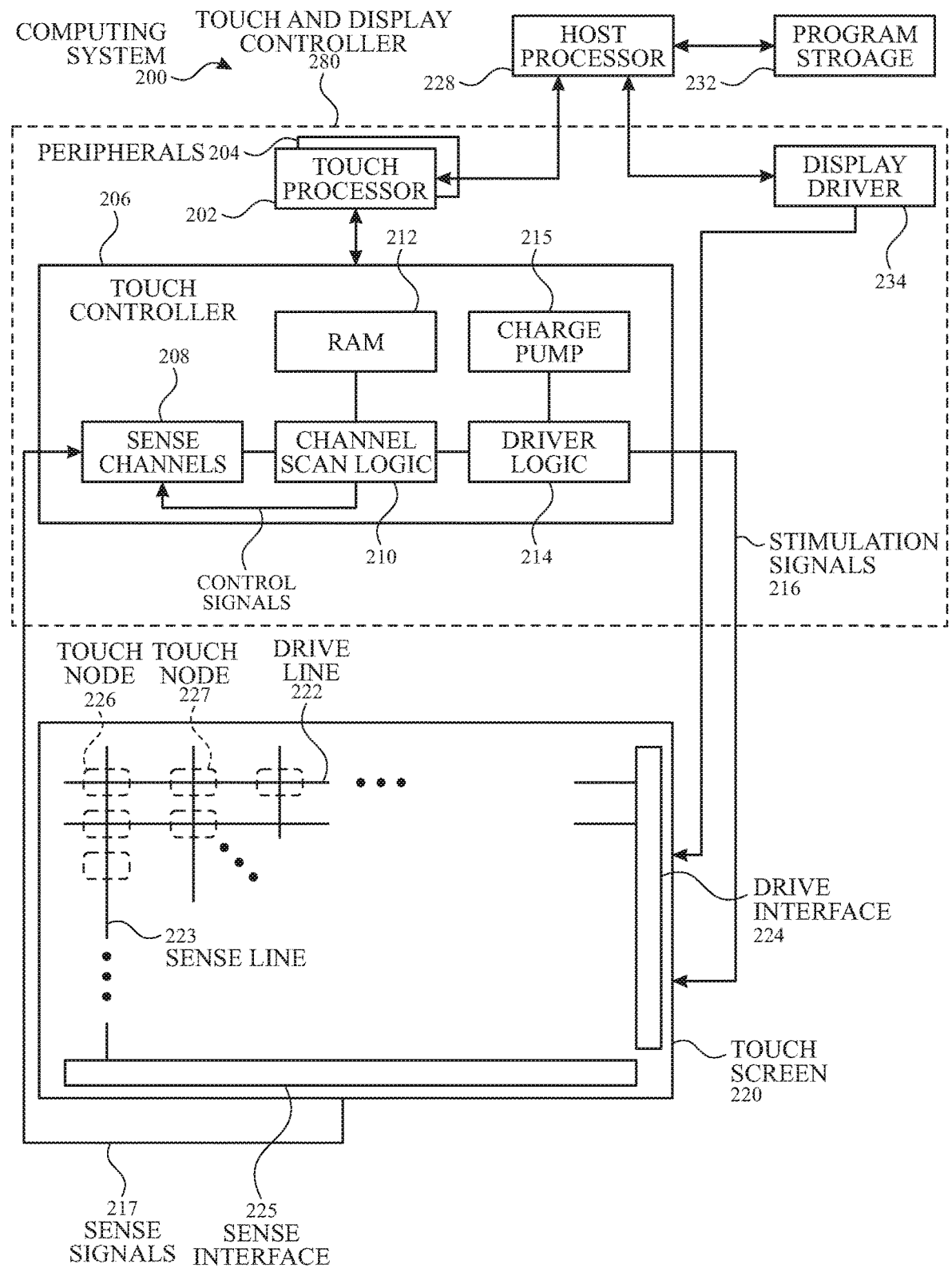
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself. In some examples, touch screen 220 including a display, touch electrodes (e.g., on the perimeter or co-located with the display) and corresponding circuitry may be referred to herein as a "touch component."

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver or more generally, display driver 234. It is understood that although some examples of the disclosure are described with reference to LCD displays, the scope of the disclosure is not so limited and can extend to other types of displays, such as Light-Emitting Diode (LED) displays, including Organic LED (OLED), Active-Matrix Organic LED (AMO-LED) and Passive-Matrix Organic LED (PMOLED) displays. The display driver 234 can provide voltages on select (e.g., gate) lines to each pixel transistor and can provide data signals along data lines to these same transistors to control the pixel display image. Additionally, in some examples, the display driver and some or all of touch controller 206, touch processor 202 and peripherals 204 can be integrated into a single application specific integrated circuit (ASIC), such as touch and display controller 280. In some examples, some circuitry used to generate the control signals at display driver 234 to provide voltages on select lines for updating the image on the display can be used for generating control signals for touch sensing as described herein. For example, the circuitry can generate an enabling token for updating a row or column of display pixels. The enabling token can also be provided to the touch sensing system (e.g., to channel scan logic 210) to control the sensing of the touch electrodes.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202 or touch controller 206, or stored in program storage 232 and executed by host processor 228 (e.g., programmed to or configured to based on programs in program storage 232). The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. In some examples, touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch node in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

In some examples, touch screen 220 can include touch sensing circuitry that can include a capacitive sensing medium having a plurality of touch electrodes arranged around the perimeter of the display (e.g., such that the touch electrodes are disposed outside of the display area, not overlapping the display area). The touch electrodes can be driven (e.g., via driver logic 214) and/or sensed (e.g., via sense channels 208) to detect whether a touch has been detected at each touch node in the touch screen.

Although FIG. 2 illustrates one touch screen 220, it is understood that a computing system can include one or more touch sensor panels (e.g., controlled by one or more touch controllers similar to touch controller 206), one or more displays (e.g., controlled by one or more display drivers similar to display driver 234), and/or one or more (partially or fully touch-sensitive) touch screens (e.g., controlled by one or more touch controllers, one or more display drivers or one or more touch and display controllers, such as touch and display controller 280).

Figure 3A:
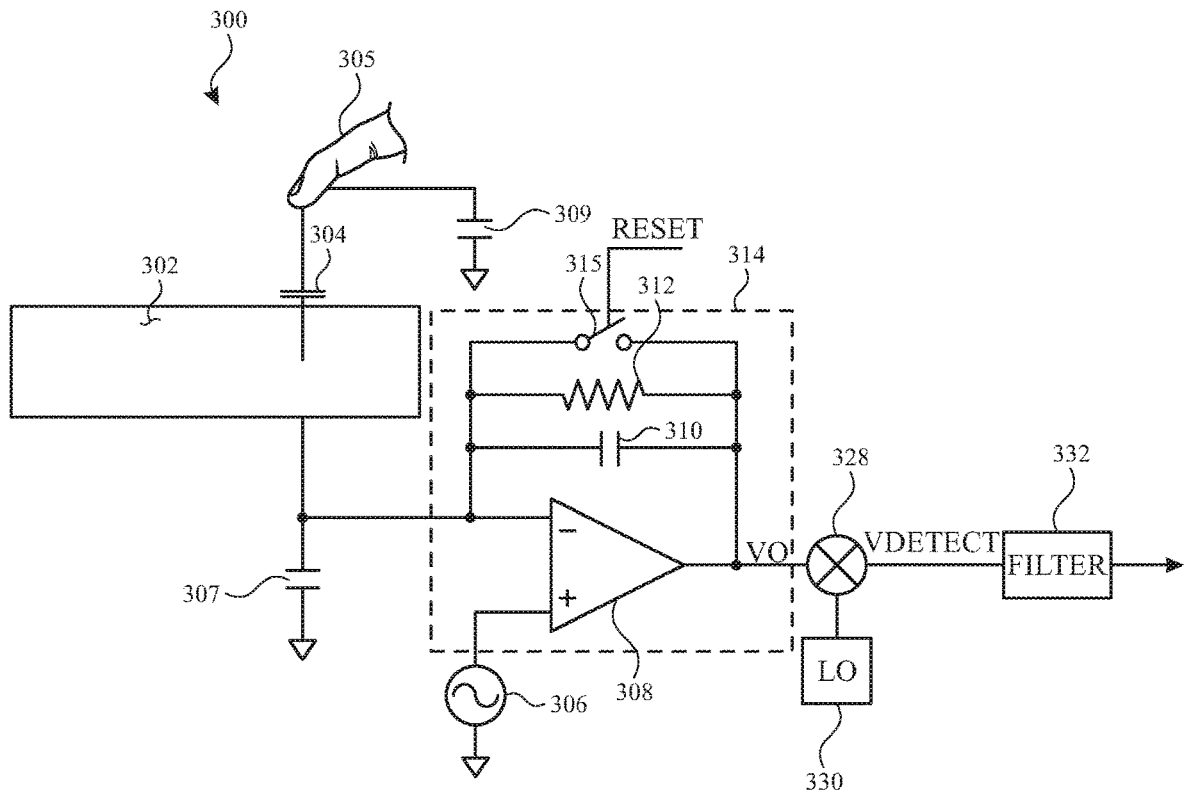
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., implemented in the one or more sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor (e.g., touch processor 202) to determine the presence of a proximity or touch event, or the output can be inputted into a discrete logic network to determine the presence of a proximity or touch event.

Figure 3B:
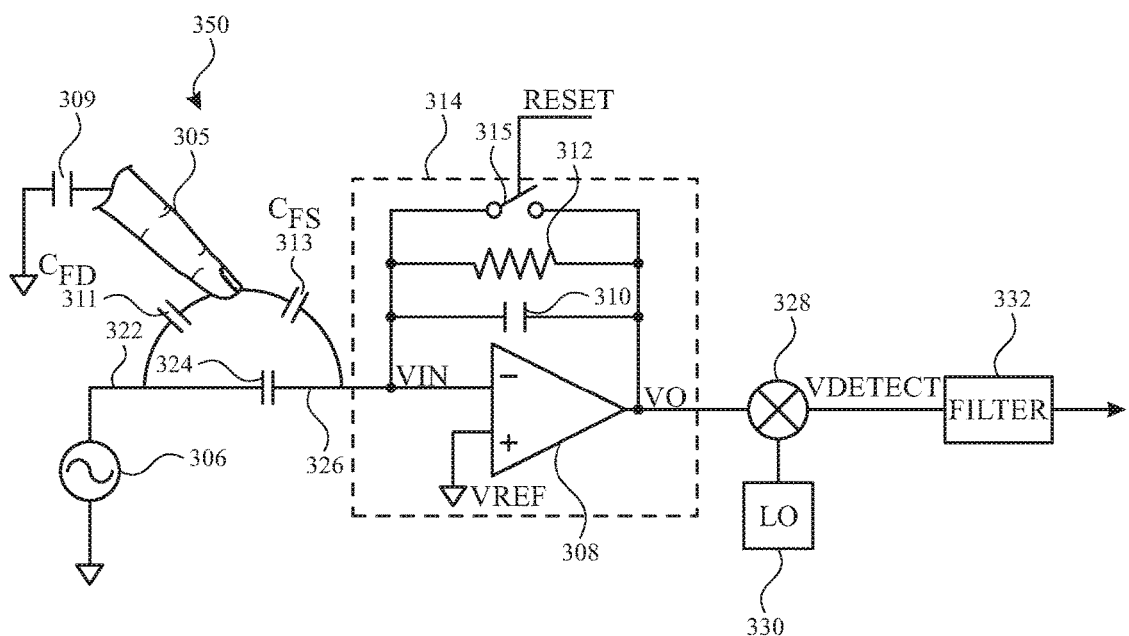
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., implemented in the one or more sense channels 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_O$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. In some examples, as described herein, some circuitry used to generate the control signals (e.g., at display driver 234) to provide voltages on select lines for updating the image on the display can be used for generating control signals for touch sensing as described herein. Additionally, in some examples, as described herein, touch electrodes can be formed from frit metal of the display.

Figure 4B:
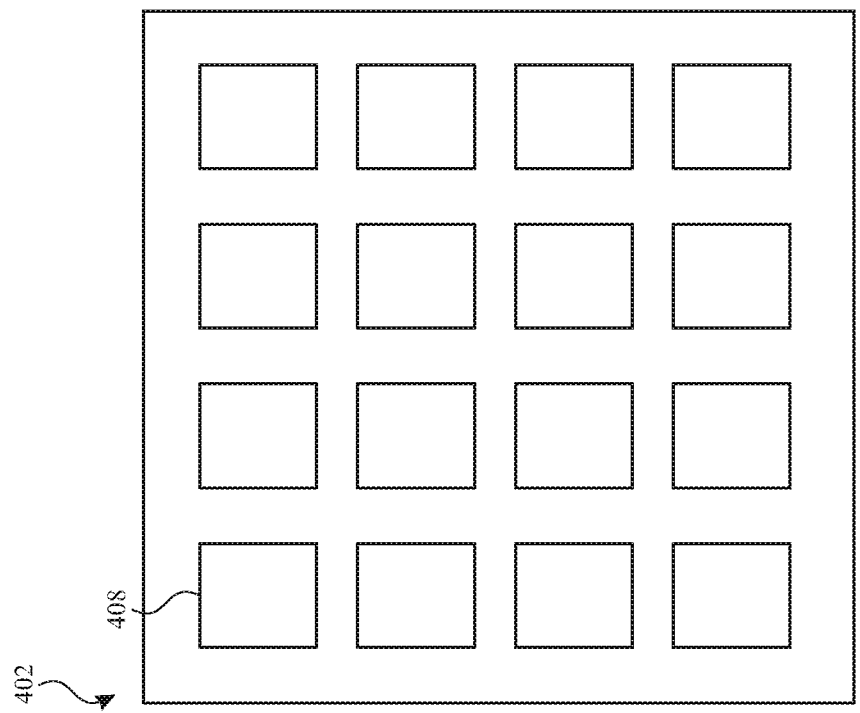
FIG. 4B illustrates a touch screen with touch node electrodes arranged in a pixelated touch node electrode configuration according to examples of the disclosure.
Figure 4A:
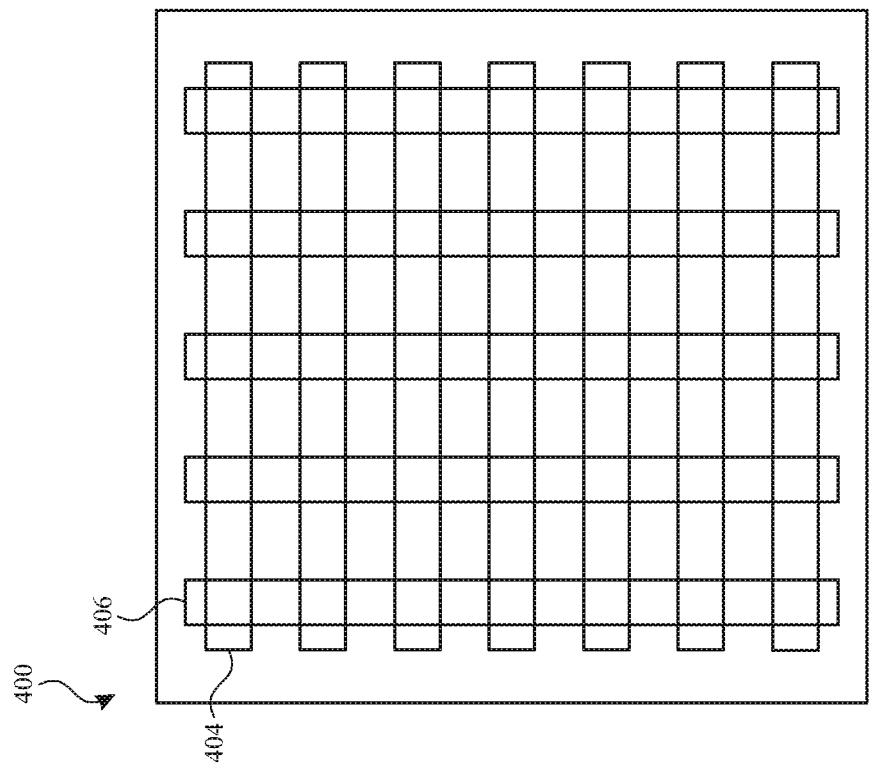
FIG. 4A illustrates a touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. In some examples, the conductive plates can be formed from other materials including conductive polymers, metal mesh, graphene, nanowires (e.g., silver nanowires) or nanotubes (e.g., carbon nanotubes). Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Although FIGS. 4A-4B illustrate touch electrodes formed over the display area of the display, in some examples, the touch electrodes can be formed at the perimeter of the display (outside the display area) rather than over the display area.

Figure 5:
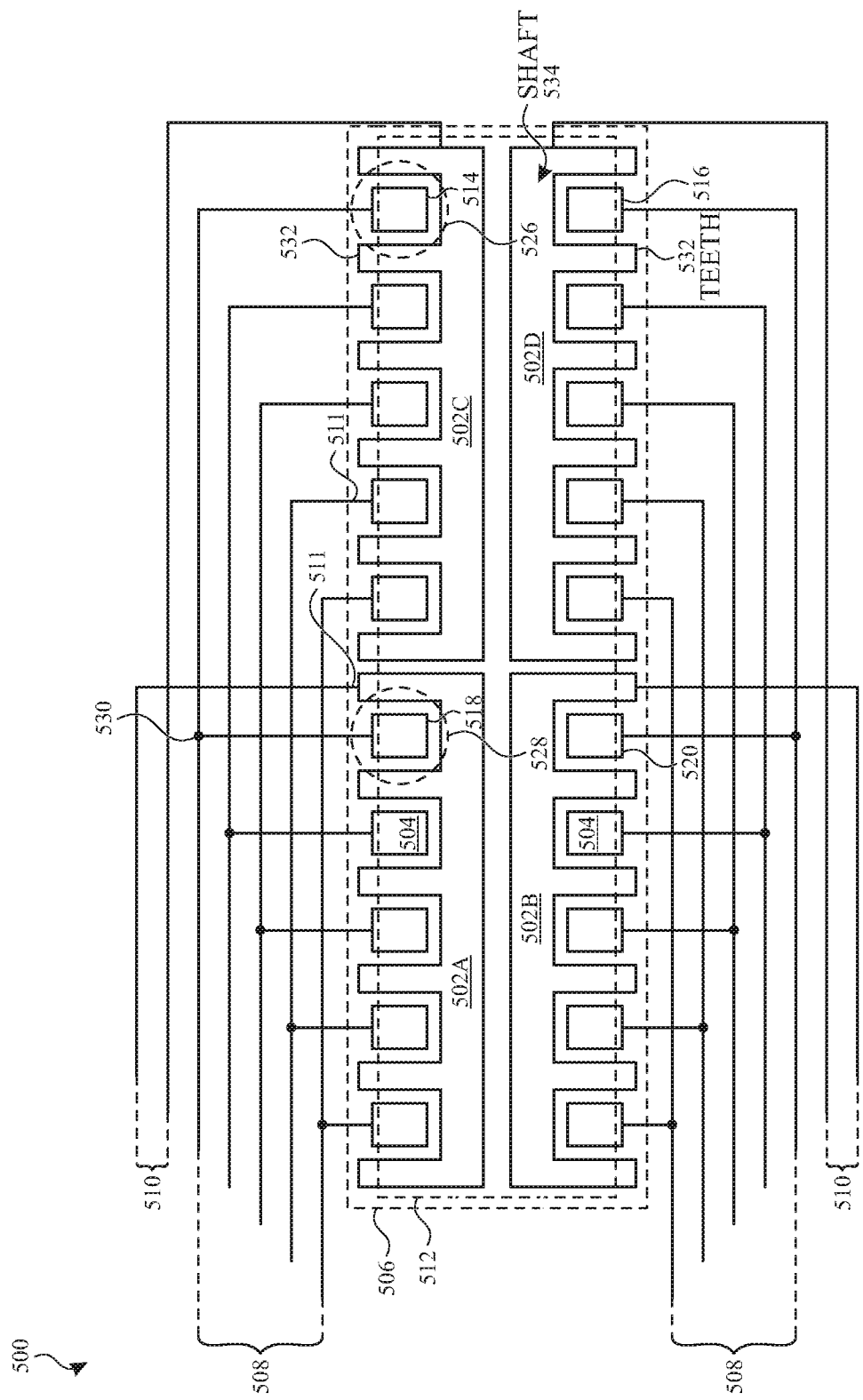
FIG. 5 illustrates an example high-aspect ratio touch sensor panel according to examples of the disclosure.

Referring back to FIG. 1, touch screen 104 in base assembly 100A can be a high aspect ratio (e.g., >4:1, >5:1, >10:1, >30:1) touch screen (or a high aspect ratio display with a touch sensor panel of similar dimensions). FIG. 5 illustrates an example high-aspect ratio touch sensor panel 500 according to examples of the disclosure. The touch sensor panel 500 of FIG. 5 can be overlaid over a display. It should be noted that examples of the disclosure are not limited to rectangular high-aspect ratio touch sensor panels 500 such as that shown in FIG. 5, but include touch sensor panels of different aspect ratios, shapes and sizes such as square touch sensor panels, circular or oval touch sensor panels, and elongated touch sensor panels having arcing or serpentine shapes, for example.

The example touch sensor panel 500 of FIG. 5 can include four row electrodes 502A-D formed in two rows on a first layer, though it should be understood that other numbers of row electrodes can also be employed within the two rows. Each row electrode 502A-D can be generally comb-shaped, having a shaft 534 and teeth 532 extending from the shaft, the teeth separating and at least partially surrounding a plurality of column electrode segment patches 504 also formed on the first layer. The column electrode segment patches in a single column, such as column electrode segment patches 518 and 520, can form one column electrode segment. For example, in some examples column electrode segment patches 518 and 520 can be coupled together (e.g., via routing 508) such that column electrode segment patches 518 and 520 and corresponding row electrodes 502A-B form two touch nodes (e.g., one touch node measuring coupling between column electrode segment patch 518 and row electrode 502A, and one touch node measuring coupling between column electrode segment patch 520 and row electrode 502B. In the example of FIG. 5, the teeth 532 of the row electrodes can be identical in shape and can be vertically aligned, but it should be understood that other shapes and orientations are possible.

In some examples, the row electrodes 502A-D and column electrode segment patches 504 can be formed from the same conductive material, such as ITO, that can be deposited in a single process step and then etched or otherwise patterned. Although the example of FIG. 5 illustrates column electrode segment patches 504 and row electrodes 502A-D that follow a generally orthogonal two-dimensional orientation (e.g., a row-column orientation), it should be understood that in other examples, the orientations need not be orthogonal, and the electrodes can have different shapes, including curved and generally non-orthogonal shapes and patterns, or interleaved and interlocking patterns. In some examples, the shapes of the row and column electrodes can be optimized for a target application. For example, if more capacitive coupling between row and column electrodes is desired, then an interleaved pattern of interlocking row and column electrodes can be employed. In another example, wider and longer row and column electrodes can be utilized for long touch sensor panels that do not need high horizontal resolution.

Row electrodes 502A-D and column electrode segment patches 504 can be formed in an active area for touch marked by line 506. Active area 506 can represent the area at which a touching or hovering object can be detected. Alternatively or additionally, active area 506 can represent the area of a display integrated with or underlying the touch sensor panel 500 (e.g., the display area).

Routing traces 508 can electrically couple the plurality of column electrode segment patches 504 to a touch controller (such as the touch controller 206 shown in FIG. 2). Routing traces 510 can also electrically couple the plurality of row electrodes 502A-D to the touch controller. Routing traces 508 and 510 can be any conductive material electrically coupled to or continuously formed with the electrodes whose function can be to provide signals to or from the electrode. Because routing traces 508 and 510 can be located in non-display areas of the touch sensor panel (i.e., outside the active area 506), the routing can be formed of lower resistance, non-transparent conductive material such as copper, and can run for longer distances and have narrower trace widths without creating excessively high line resistance (e.g., line resistances similar to that of ITO with narrower width and/or longer trace length). In addition, routing traces 508 and 510 can be formed on different layers and can cross over each other with insulating material in between in areas outside the active area 508 where optical uniformity may not be a concern.

Routing traces can, in some examples, have a trace width narrower than that of the coupled electrode. The difference in material properties and/or size and/or shape of the routing traces as compared to their coupled electrodes can reduce the optical uniformity of the touch sensor panel. In some examples, a portion 511 of routing traces 508 and 510 can appear within the active area 506. However, because the portion 511 of routing traces 508 and 510 appearing within the active area 506 may be small and can be located at the edges of the active area, any decrease in optical uniformity caused by the routing traces in the active area can be minimal. In other examples, the electrodes 502A-D, 504 and routing traces 508, 510 can be located such that the routing is entirely outside the active area, as indicated by alternative active area 512 (e.g., corresponding to the display area) in FIG. 5. In this example, routing traces 508 and 510 may not contribute to any decrease in optical uniformity over the display area.

Because all routing trace crossovers occur outside the active areas 506 or 512 in the example of FIG. 5, there may be no need for bridges and insulating layers in the active area, and no need for necked-down row electrodes. As a result, the examples of FIG. 5 can provide one or more advantages, such as a reduction in panel thickness, physical defects, manufacturing process steps/time, cost, parasitic capacitance, structural failures during operation, or degraded touch sensing performance, while also increasing optical uniformity. In particular, the example of FIG. 5 can have much less resistance per column of column electrodes due to the absence of bridges, and it can have much less resistance per row electrode due to the absence of necked-down areas.

In some examples of the disclosure, routing traces 508 can individually couple column electrode segment patches 504 to the touch controller. In some examples, one sense channel in the touch controller may be required for each column electrode segment patch 504, though in other examples, a plurality of column electrode segment patches can be connected to a single sense channel. In some examples, one or more sense channels can be shared by the column electrode segment patches 504. In such examples, one or more multiplexers or switch arrays can be used to connect one or a plurality of the column electrode segment patches 504 to the one or more shared sense channels. In other examples, routing traces 508 can couple together column electrode segment patches in the same column electrode segment, such as column electrode segment patches 514 and 516 (although the partial routing traces 508 shown in FIG. 5 do not actually show the coupling of those electrodes), to reduce the number of routing traces required. In other examples, routing traces 508 can couple together column electrode segment patches in the same column electrode segment (e.g., column electrode segment patches 514 and 516), and additionally column electrode segment patches in one or more different column electrode segments, such as column electrode segment patches 518 and 520 in FIG. 5, if those column electrode segments form part of the same column electrode (e.g., coupling together column electrode segment patches 514, 516, 518 and 520, forming four touch nodes with corresponding row electrodes 502A-D).

Although the example of FIG. 5 illustrates routing traces 508 having connection points 530 outside the active area 506 (or alternatively 512), in other examples of the disclosure the connections can be made in a flex circuit that can couple the touch sensor panel to the touch controller, or even in the touch controller itself. By making these connections off the touch sensor panel, in some examples, the routing traces 508 and 510 can be formed without crossovers in a single process step on the same layer, and then etched or otherwise patterned.

In mutual capacitance examples, where the column electrodes can be used as sense lines and the column electrode segment patches associated with the same column electrode share the same routing trace, as with column electrode segment patches 514 and 518 in FIG. 5, the same sense signal can appear on that routing trace regardless of whether a touch occurs at location 526 or 528, for example. To determine which location was actually touched, in some examples of the disclosure, single-stim mutual capacitance sensing can be employed, where each row electrode can be stimulated at different times while the column electrodes are being sensed in parallel. This sequential stimulation of different row electrodes at different times can enable the touch controller to unambiguously determine which location on the touch sensor panel is being touched. In other examples of the disclosure, multi-stim mutual capacitance sensing can be employed, where a plurality of row electrodes can be stimulated at the same time, over multiple steps, with signals of different phases and/or frequencies that can vary at each step, while the column electrodes are being sensed in parallel. The touch controller can perform post-processing of the composite sense signals appearing on the column electrodes to unambiguously determine which location on the touch sensor panel is being touched.

In some examples of the disclosure, the touch sensor panel can be used in a self-capacitance touch sensing system, as described above. In one self-capacitance example, both the row electrodes and the column electrodes can be driven with stimulation signals and also sensed using the sense channels in the touch controller.

In self-capacitance examples, wherein the column electrodes are used as sense lines and the column electrode segment patches associated with the same column electrode share the same routing trace, as with column electrode segment patches 514 and 518 in FIG. 5, the same sense signal can appear on that routing trace regardless of whether a touch occurs at location 526 or 528, for example. To determine which location was actually touched, in some examples of the disclosure the touch controller can additionally consider the sense signals appearing on the row electrodes at the same time. In the example of FIG. 5, if the sense signal on the routing trace coupled to both column electrode segment patches 514 and 518 appears to indicate a touch, the sense signals on the routing traces coupled to row electrodes 522 and 524 can be evaluated. If, for example, a touch is indicated at both column electrode segment patches 514 and 518 and also on row electrode 524 (but not on row electrode 522), it can be determined that a touch is present at location 528, but not location 526.

In some examples of the disclosure, the column electrode segment patches 514 and 516 can be electrically coupled together because each of those column electrode segment patches are all part of a single column electrode segment. Although the description of FIG. 5 mentions that these couplings can be accomplished outside the active area of the touch sensor panels, in other examples of the disclosure these electrical couplings can be formed within the active area.

As described herein, in some examples, the touch electrodes can be formed on the perimeter (e.g., one or more sides) of the display rather than overlaid over the display. FIGS. 6A-6B illustrate an example touch screen including perimeter touch electrodes according to examples of the disclosure. Touch screen 600 can include a display 602 and perimeter touch electrodes 604A-B. In some examples, as illustrated in FIGS. 6A-B, the touch electrodes 604A can be arranged in a one-dimensional array on a first side (e.g., top side) of display 602 and the touch electrodes 604B can be arranged in a one-dimensional array on a second side (e.g., bottom side) of display 602. Although illustrated on two sides of the display, it is understood that, in some examples, the perimeter touch electrodes can be disposed on more or fewer sides of the display (one, three, four sides, etc.). Additionally, although illustrated as one dimensional arrays on each of the two sides, it is understood that, in some examples, the perimeter touch electrodes can be disposed in different arrangements that are multi-dimensional.

In some examples, the self-capacitance at each of (or of a subset) of touch electrodes 604A and 604B can be measured. When a finger 620 (e.g., as shown in the view of FIG. 6B) contacts or is in proximity to display 602, the contacted and/or proximate touch electrodes can experience a change (e.g., increase) in measured capacitance. For example, as shown in FIG. 6A, capacitance measurements 606 for touch electrodes 604A in proximity to finger 620 can indicate the presence of finger 620 and capacitance measurements 608 for touch electrodes 604B in proximity to finger 620 can indicate the presence of finger 620. In some examples, the capacitance measurements can be used to identify touch on display 602 without overlaid touch electrodes (e.g., as shown in FIGS. 6A-6B). In some examples, the indication of contact or proximity centered at touch electrode 604A' in capacitance measurements 606 (e.g., from computing a centroid of capacitance measurements 606), and/or the indication of contact or proximity centered at touch electrode 604B' in capacitance measurements 608 (e.g., from computing a centroid of capacitance measurements 608) can be used to detect touch (e.g., impute touch) on display 602. In some examples, the indication of touch or proximity centered at touch electrode 604A' can be recorded (or otherwise understood by the touch sensing system) as a touch or proximity input to display 602 at location 614, which may correspond to input to a graphical user interface (GUI) element 610 displayed on display 602 (e.g., a button, slider, or other GUI element). In some examples, the indication of touch or proximity centered at touch electrode 604B' can be recorded as a touch or proximity input to display 602 at location 616, which may correspond to GUI element 610. In some examples, the combined indication of contact/proximity at touch electrodes 604A' and 604B' can be recorded as a touch or proximity input to display 602 at location 612 (e.g., between locations 614 and 616). In some examples, without the indication of touch or proximity at both 604A' and 604B', the system can ignore the inputs (e.g., detect no touch on display 602).

In some examples, when the centroid of touch electrodes 604A and the centroid of touch electrodes 604B do not indicate the same location along the axis of the touch electrode array (x-axis, horizontal axis in FIGS. 6A-6B), these centroids/locations can be averaged or otherwise combined to record a touch on the display at a location indicated by the averaged/combined centroids. In some examples, the averaging or combining may occur only when the centroids (top and bottom) be within a threshold distance of one another (e.g., within a threshold distance or threshold number of touch electrodes) along the axis (x-axis, horizontal axis). In some examples, location 612 can corresponding to the center of display 602 with respect to the axis perpendicular to the axis of the touch electrode array (y-axis, vertical axis in FIGS. 6A-6B). In some examples, location 612 with respect to this axis (y-axis, vertical axis) can be weighted or otherwise combined based on the relative signal strength on either side of display 602. In some examples, the centroid of capacitance measurements 606 and 608 can be calculated together to provide location information that provides a two dimensional location the display (e.g., one centroid to determine a 2D location of recorded touch or proximity input on the display based on the capacitive measurements 606 and 608 corresponding to finger 620). In some examples, corresponding touch electrodes 604A and 604B with the same x-axis position can be tied together outside of the display area (e.g., in a similar manner as discussed above for column electrode segment patches 518 and 520), and one centroid can be determined to provide an x-axis location (e.g., centered in the y-axis).

In some examples, the self-capacitance of touch electrodes 604A-B can be measured simultaneously. For example, each touch electrode can include a corresponding sensing circuit (e.g., corresponding to sensing circuit 314) to measure self-capacitance. In some examples, to reduce the number of sense channels/sensing circuits, corresponding touch electrodes 604A and 604B with the same x-axis position can be tied together and/or tied to a sense channel/sensing circuit. Such a coupling can reduce the number of sense channels/sensing circuits in half In some examples, switching circuitry can be used to connect a respective touch electrode of touch electrodes 604A to a sense channel/sensing circuit. For example, in a single stimulation sensing scheme, one sense channel/sensing circuit can be coupled to one touch electrode 604A or 604B at a time. During a self-capacitance scan of touch screen 600, each touch electrode can be sensed independently. In some examples, a number of sense channels/sensing circuits can be distributed between the touch electrodes, and switching circuitry (e.g., one switching circuit—such as a MUX—per sense channel/sensing circuit employed for sensing) can be used to couple and sense multiple touch electrodes at the same time (e.g., 40 touch electrodes can be sensed in 10 steps by 4 sense channels/sensing circuits; 40 touch electrodes can be sensed in 5 steps by 8 sense channels/sensing circuits).

FIG. 7 illustrates an example configuration 700 for touch electrodes and switching circuitry according to examples of the disclosure. Configuration 700 includes three touch electrodes 702A-C (e.g., corresponding to three of touch electrodes 604A or to three of touch electrodes 604B in FIGS. 6A-6B) for ease of description, representative of perimeter touch electrodes and corresponding circuitry in a one dimensional array on one side of the display. It should be understood that a given array of touch electrodes can include fewer or more than three touch electrodes. It should also be understood that configuration 700 can be repeated, in some examples, for touch electrodes on other sides of the display. In addition to touch electrodes, configuration 700 also includes a stimulation electrode 704, disposed in a different layer than touch electrodes 702A-C, and switching circuitry that includes switches SW_A, SW_B, and SW_C corresponding to touch electrodes 702A-C. Each of the switches can be controlled by a switch control signal (e.g., from touch controller 206, display driver 234 and/or touch and display controller 280, or other switching control circuitry) that can couple (or decouple) a respective one (or group) of the touch electrodes to (from) stimulation electrode 704. Although not shown, stimulation electrode 704 can be coupled to a sense channel/sensing circuit (e.g., sense channel 208 or sensing circuit 314). For example, stimulation electrode 704 can be coupled to the inverting input of an amplifier (e.g., amplifier 308), and a drive signal or stimulation signal can be coupled to the non-inverting input of the amplifier. As a result, the respective touch electrode of touch electrodes 702A-C coupled to stimulation electrode 704 by a respective switch can be driven and sensed to measure the self-capacitance of the respective electrode. The touch sensing process can cycle through and couple each of the touch electrodes to the touch sensing circuitry during the touch sensing scan to sense a self-capacitance at each of the touch electrodes of the touch sensor panel/screen.

In some examples, a shield layer 706 can be disposed between touch electrodes 702A-C and stimulation electrode 704. In some examples, shield layer 706 can be grounded. In some examples, shield layer can be driven with another voltage (e.g., by touch controller 206). Shield layer 706 can prevent or reduce parasitic coupling of the stimulation 704 to touch electrodes that are decoupled via switching circuitry at a given step of the touch sensing scan. Although not shown in FIG. 7, one or more isolation layers or materials may be disposed between touch electrodes 702A-C, stimulation electrode 704 and shield layer 706.

Figure 8:
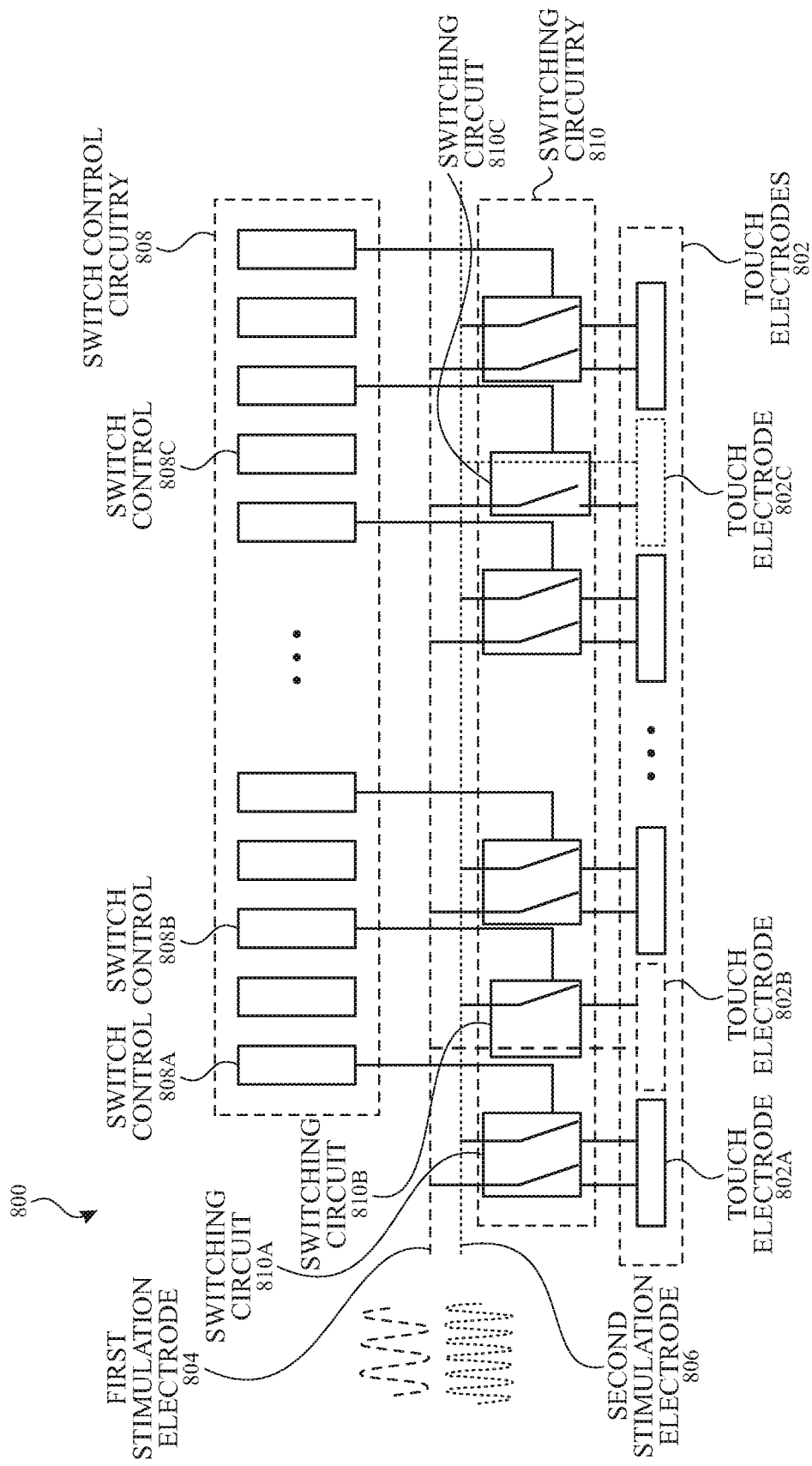
FIG. 8 illustrates an example configuration for touch electrodes and switching circuitry according to examples of the disclosure.

In some examples, two (or more) stimulation frequencies provided by two or more stimulation electrodes can be used (e.g., to increase the scanning rate of touch sensing). FIG. 8 illustrates an example configuration 800 for touch electrodes and switching circuitry according to examples of the disclosure. Like configuration 700, configuration 800 illustrates touch electrodes 802 representative of perimeter touch electrodes (e.g., a one-dimensional array). It should be understood that a given array of touch electrodes 802 can include fewer or more touch electrodes than illustrated, and configuration 800 can be repeated, in some examples, for touch electrodes on other sides of the display (e.g., for a second, opposite side). In addition to touch electrodes 802, configuration 800 also includes two stimulation electrodes—first stimulation electrode 804 and second stimulation electrode 806—disposed in a different layer than touch electrodes 802, and switch control circuitry 808 and switching circuitry 810 corresponding to touch electrodes 802. First stimulation electrode 804 and second stimulation electrode 806 can be implemented in the same layer or different layers. One or more shield layers (e.g., corresponding to shield layer 706) and one or more insulation layers may be included to enable selective driving and sensing of touch electrodes with reduced interference and parasitic coupling.

Switching circuitry 810 can be a single component (e.g., a monolithic chip including multiple switches or multiplexers (MUXs)) or can include multiple discrete components (e.g., multiple switches or MUXs). Each of the switching circuits (e.g., switching circuits 810A-C) can be controlled by one or more switch control signals from switch control circuitry 808 (e.g., implemented as part of controller 206, display driver 234 and/or touch and display controller 280) that can couple a respective one (or group) of the touch electrodes 802 to first stimulation electrode 804 or second stimulation electrode 806. For example, switching circuit(s) for each touch electrode can include two switches or a MUX to couple the respective touch electrode to one of the two (or to neither) of the stimulation electrodes. For example, FIG. 8 illustrates touch electrode 802 decoupled from the first stimulation electrode and the second stimulation electrode by switching circuit 810A (as shown by two open switches), touch electrode 802B coupled to first stimulation electrode 804 via switching circuit 810B (with the dashed line replacing the closed switch making the electrical connection), and touch electrode 802C coupled to the second stimulation electrode 806 via switching circuit 810C (with the dashed line replacing the closed switch making the electrical connection). The switching circuits 810A-C can be controlled by switching control signals from corresponding switch controls 808A-C. As a result, the respective touch electrode(s) of touch electrodes 802 coupled to stimulation electrode 804 or 806 by a respective switching circuit can be driven and sensed to measure the self-capacitance of the respective electrode(s).

Although not shown, stimulation electrodes 804, 806 can be coupled to sense channels/sensing circuits (e.g., sense channels 208 or sensing circuits 314). For example, first stimulation electrode 804 can be coupled to the inverting input of a first amplifier (e.g., amplifier 308), and a first drive signal or stimulation signal can be coupled to the non-inverting input of the first amplifier. Likewise, second stimulation electrode 806 can be coupled to the inverting input of a second amplifier (e.g., amplifier 308), and a second drive signal or stimulation signal can be coupled to the non-inverting input of the second amplifier. The first drive/stimulation signal and the second drive/stimulation signal can have different frequencies so that the touch sensing circuitry can simultaneously drive multiple touch electrodes and separate the results (which may include components from two different touch electrodes/stimulation frequencies) based on the different frequencies (e.g., using different filters, such as filters 332).

In some examples, during touch sensing, switch control circuitry 808 can provide two enable tokens to (or generate the switch control signals based on two enable tokens for) switching circuitry 810 to couple a first respective touch electrode to a first stimulation electrode and a second respective touch electrode to a second stimulation electrode, and to decouple the remaining touch electrodes. The touch sensing process can cycle through to couple each of the touch electrodes to the touch sensing circuitry during touch sensing scan to sense a self-capacitance at each of the electrodes of the touch sensor panel/screen. The tokens can be cycled to enable scanning touch electrodes 802 with the first drive/stimulation signal and/or the second drive/stimulation signal. Time savings can be achieved by driving each touch electrode with one of the two drive/stimulation signal per cycle. In some examples, each touch electrode can be driven with two drive/stimulation signals per cycle (e.g., the first drive/stimulation signal and the second drive stimulation signal). Scanning each touch electrode twice (once at each of two different frequencies) can provide for more robust touch detection (e.g., in the case of noise or other interference at one of the two stimulation frequencies).

In some examples, the perimeter touch electrodes can be formed of frit metal used to encapsulate the display. Frit bonding techniques can be used for display encapsulation. In some examples, the frit material can be disposed around the perimeter of the display and can be irradiated with light (e.g., red or infrared light, among other possible wavelengths of electromagnetic energy) by a light source (e.g., a laser) to melt the frit material. In some examples, to improve the heating and energy absorption of the frit material, a metallic electrodes or other conductive material can be disposed in or proximate to the frit material. The metallic electrodes (or other conductive material) can be referred to herein as "frit metal." Conventionally, the frit metal around the perimeter of the display can be contiguous. In some examples, to use frit metal as touch electrodes, the frit metal can be divided into segments and each frit metal segment (or a group of segments) can form a perimeter touch electrode. The frit metal, when divided into segments, are frit metal comprising non-contiguous frit metal segments. The frit metal segments are electrically separated in that one adjacent frit metal segment can carry a first signal of a first potential (e.g., a stimulation signal) while an adjacent frit metal segment can carry a different second signal of a different second potential (e.g., floating, grounded, acting as a sense node, etc.).

Figure 9:
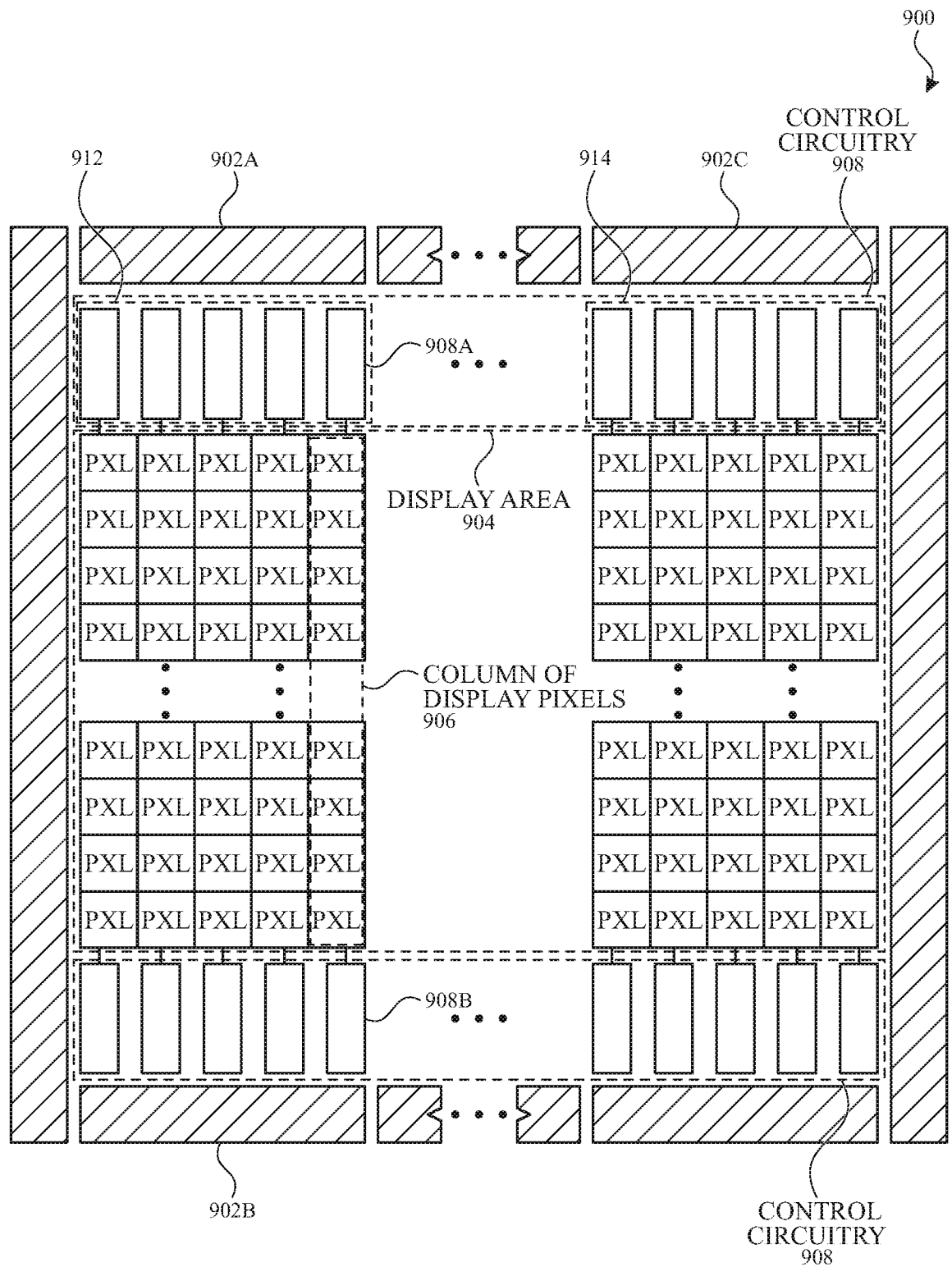
FIG. 9 illustrates an example touch screen including segmented frit metal according to examples of the disclosure.

FIG. 9 illustrates an example touch screen including segmented frit metal according to examples of the disclosure. Touch screen 900 (e.g., corresponding to touch screen 600) can include touch electrodes 902A-902B (e.g., corresponding to touch electrodes 604A-B) formed from frit metal (shaded in FIG. 9) around the perimeter of the display. The display can be formed in display area 904 from an array of display pixels (e.g., each including red, green and blue LEDs), labeled "PXL" in FIG. 9. As illustrated in FIG. 9, some frit metal may be used for touch electrodes 902A (top side, outside of display area 904) or touch electrodes 902B (bottom side, outside of display area 904). The frit metal can be segmented, rather than contiguous, to provide for touch electrodes 902A-B. Some frit metal segments may not be used for touch electrodes. For example, the frit metal on the left and right sides of display area 904 in FIG. 9 may not be segmented, as no touch electrodes are implemented on these sides for touch screen 900. It should be understood the frit metal may generally be segmented on sides of the display area implementing perimeter touch electrodes and unsegmented on sides of the display not implementing perimeter touch electrodes.

In some examples, as illustrated in FIG. 9, control circuitry 908 can be included between the touch electrodes 902A-902B and the display pixels. Control circuitry 908 may alternatively be implemented in part or entirely in another location (e.g., outside the encapsulation, such as in touch and display controller 280). Control circuitry 908 can provide control signals to the display pixels and/or touch electrodes of the touch screen. In some examples, the control signals can be provided for both touch operation and display operation simultaneously. In some examples, the control signals can be time-multiplexed (e.g., provided at different times to reduce interference between touch and display). In some examples, control circuitry 908 in FIG. 9 can represent conductive traces carrying control signals.

In some examples, control signals can be used to drive the display. For example, each control circuit (e.g., a conductive trace carrying a control signal) illustrated in FIG. 9 can provide a control signal to update a subset of the display pixels. For example, control circuit 908A (e.g., carrying a control signal) can control a gate line for a column of display pixels 906. When the control signal activates the gate line, voltages on the pixel electrodes in the column of display pixels 906 can be supplied by data lines to update the display. In a similar manner, the other control circuits can provide control signals to activate the gate lines to update the remaining columns of display pixels. In some examples, control circuitry 908 can include a shift register (e.g., a logic circuit formed of discrete flip-flops or implemented in a programmable logic device or logic gate array) and possibly other logic circuitry (e.g., multiplexers, switches, registers, etc.) to cycle through and update the display during each display frame by providing control signals to each of the columns of the display (e.g., passing a gate line enable token via the shift register). For example, for a display with N columns and a 60 Hz display rate, N control signals can be generated to activate each of the columns once every second (e.g., the display frame can be divided into sub-frames of duration 1/N seconds, and each of the N control signal can be generated during one of the sub-frames to activate the gate line corresponding to one of the N columns).

In some examples, control circuitry 908 can perform head-to-head driving. For example, rather the one control circuit generating a control signal for a column, a pair of control circuits can generate a pair of control signals for the column. For example, one control signal can be applied by control circuit 908A to update the display pixels for the top half of the column of display pixels 906 and one control signal can be applied by control circuit 908B to update the display pixels for the bottom half of the column of display pixels 906. In some such examples, control circuit 908A and 908B can be activated at the same time to update the entire column at the same time (e.g., the control circuit 908A-B can be tied together). In some examples, control circuit 908A and 908B can be activated at different times (e.g., doubling the number of gate line control signals).

In some examples, control circuitry 908 can provide control signals to the touch electrodes. In some examples, the control signals generated for updating the display can be shared and used to activate touch electrodes for touch sensing. For example, the control circuit corresponding to touch electrode 902A can be used to couple touch electrode 902A to touch sensing circuitry. For example, the control signal can be a switch control signal to close a switch and couple a touch electrode to a stimulation electrode (e.g., corresponding to controlling a switch to couple touch electrodes 702A-C or 802 to stimulation electrodes 704, 804 or 806). In a similar manner as discussed above with respect to the display pixels, the control signals can be cycled during a touch sensing scan to couple each of the touch electrodes to the sensing circuitry (e.g., as described with respect to FIGS. 7-8).

In some examples, the number of touch electrodes can be fewer than the number of display columns, and as a result fewer control signals may be needed for controlling the touch sensing operation than for controlling the display update operation. In some examples, the control circuitry 908 can combine multiple control circuits/control signals corresponding to a touch electrode. For example, a group 912 of touch circuits corresponding to touch electrode 902A can be coupled to touch electrode 902A via an OR logic gate (not shown) such that the touch electrode can activated for touch sensing for each of the control signals (activating the display columns). In some examples, a subset of the touch circuits/touch signals can be used to control the coupling of touch electrode (e.g., one or more but not all of the touch circuits/touch signals in group 912), such that the duration of the touch sensing may be shorter than the duration of display update. In some examples, instead of an OR gate, a logic register can be used. For example, a first of the control signals provided by group 912 of the touch circuits can be used to latch the register to activate the touch sensing of touch electrode 902A and a second control signal provided by group 912 can be used to reset the register and deactivate touch sensing of touch electrode 902A. In a similar manner, a group 912 of touch circuits corresponding to touch electrode 902C can be coupled to touch electrode 902C via an OR logic gate or a register to activate touch electrode 902C for touch sensing.

In some examples, separate control circuitry can be implemented for display operation and for touch sensing operation. However, sharing control circuitry 908 for the display and touch electrodes can reduce the circuitry and associated routing needed as compared with implementing separate control circuitry for touch and for display.

Although primarily discussed from the perspective of self-capacitance touch sensing with respect to FIGS. 6A-8, in some examples, perimeter touch electrodes can be sensed using mutual capacitance touch sensing. FIG. 10 illustrates an example configuration 1000 for touch electrodes and optionally switching circuitry according to examples of the disclosure. Touch electrodes 1002A-C and stimulation electrode 1004 can be separated by an insulation layer 1006 (e.g., a dielectric layer). Stimulation electrode 1004 (e.g., a drive line) can stimulated with a drive/stimulation signal and a mutual capacitance can be formed between stimulation electrode 1004 and touch electrodes 1002A-C (e.g., sense lines). Although not shown, stimulation electrode 1004 can be coupled to drive circuitry (e.g., driver logic 214, AC voltage source 306). Touch electrodes 1002A-C can be coupled to sense circuitry (e.g., to the inverting input of amplifier 308 of sensing circuit 314) to measure changes (e.g., decrease) in mutual capacitance. In some examples, each touch electrode can be coupled to a corresponding sense channel (to enable simultaneous sensing of the mutual capacitance for each touch electrode). In some examples, touch electrodes can be coupled to one or more sense channels (e.g., sensing circuit 314) via switches (e.g., SW_A-SW_C) rather than a direct connection. In some examples, the switching can be controlled by switching control signals. In some examples, the coupling between the touch electrodes and sense channels can be direct (fixed). In some examples, the mutual capacitance can be measured for all the touch electrodes in one scan step. In some examples, the mutual capacitance can be measured for a subset of the touch electrodes in each scan step, and the mutual capacitance can be measured for the touch electrodes in multiple scan steps. Although configuration 1000 includes three touch electrodes 1002A-C for ease of description, it should be understood that a given array of touch electrodes can include fewer or more than three touch electrodes (and may be repeated for touch electrodes on other sides of the display).

Figure 11A:
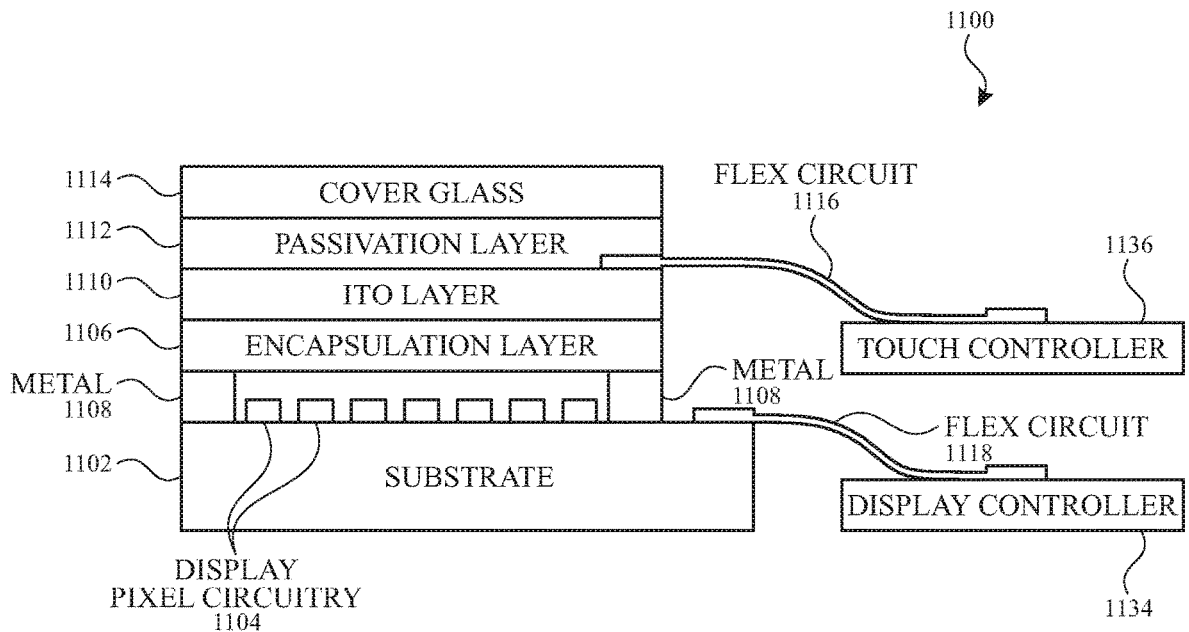
FIGS. 11A-11B illustrate exemplary stack-ups for touch screens according to examples of the disclosure.
Figure 11B:
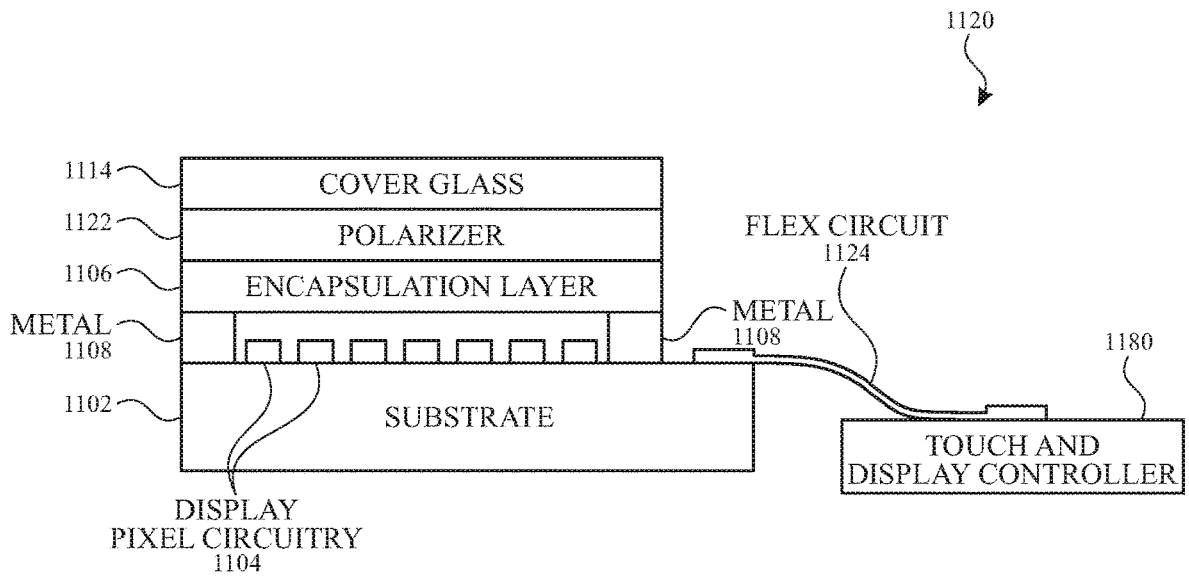

In some examples, perimeter touch electrodes can simplify the integration of the touch and display functionality for a touch screen (e.g., touch screen 104). For example, FIGS. 11A-11B illustrate exemplary stack-ups 1100 and 1120 for touch screens according to examples of the disclosure. Stack-up 1110 (e.g., corresponding to touch sensor panel 500) can include a substrate 1102 supporting display pixel circuitry 1104 (e.g., LEDs and transistors to operate the LEDs). The display pixel circuitry 1104 can be encapsulated by encapsulation layer 1106. The encapsulation can be achieved by frit bonding the encapsulation layer 1106 and substrate 1102 with a frit material. The frit material can be melted with assistance of a metallic conductor (e.g., frit metal 1108). Touch electrodes (e.g., corresponding to row electrodes 502A-D and column electrode segment patches 504) can be disposed in ITO layer 1110 of stack-up 1110 (e.g., overlapping the display pixel circuitry 1104). Stack up 1100 can also include passivation layer 1112 and cover glass 1114 (e.g., glass crystal, sapphire crystal, plastic, etc.). Passivation layer 1112 can be disposed over the ITO layer 1110 to planarize the surface for improved bonding with cover glass 1114. In some examples, passivation layer 1112 can also include a polarizer. The touch electrodes in ITO layer 1110 can be coupled to touch controller 1136 (e.g., corresponding to touch controller 206) via flex circuit 1116 for touch sensing operation, and display pixel circuitry 1104 can be coupled to display controller 1134 (e.g., corresponding to display driver 234) via flex circuit 1118 for display operations. In some examples, touch controller 1136 and display controller 1134 can be implemented together (e.g., in an integrated touch and display controller).

Stack-up 1120 (e.g., corresponding to touch sensor panel 600) can include a substrate 1102 supporting display pixel circuitry 1104 encapsulated by encapsulation layer 1106 (e.g., achieved by frit bonding the encapsulation layer 1106 and substrate 1102 with a frit material). The frit material can be melted with assistance of a metallic conductor (e.g., frit metal 1108). Touch electrodes (e.g., corresponding to touch electrodes 604A-B) can be formed from frit metal 1108. Stack up 1120 can also include a polarizer 1122 and cover glass 1114 (e.g., glass crystal, sapphire crystal, plastic, etc.). The touch electrodes formed from frit metal 1108 and display pixel circuitry 1104 can be coupled to touch and display controller 1180 (e.g., corresponding to touch and display controller 280) via flex circuit 1124 for touch sensing operation and display operations. As illustrated in FIG. 11B, forming touch electrodes from frit metal can simplify assembly and save space by reducing the number of flex circuits (e.g., flex circuit 1124 vs. flex circuits 1116 and 1118) and controller circuits (e.g., touch and display controller 1180 vs. display controller 1134 and touch controller 1136).

Figure 12A:
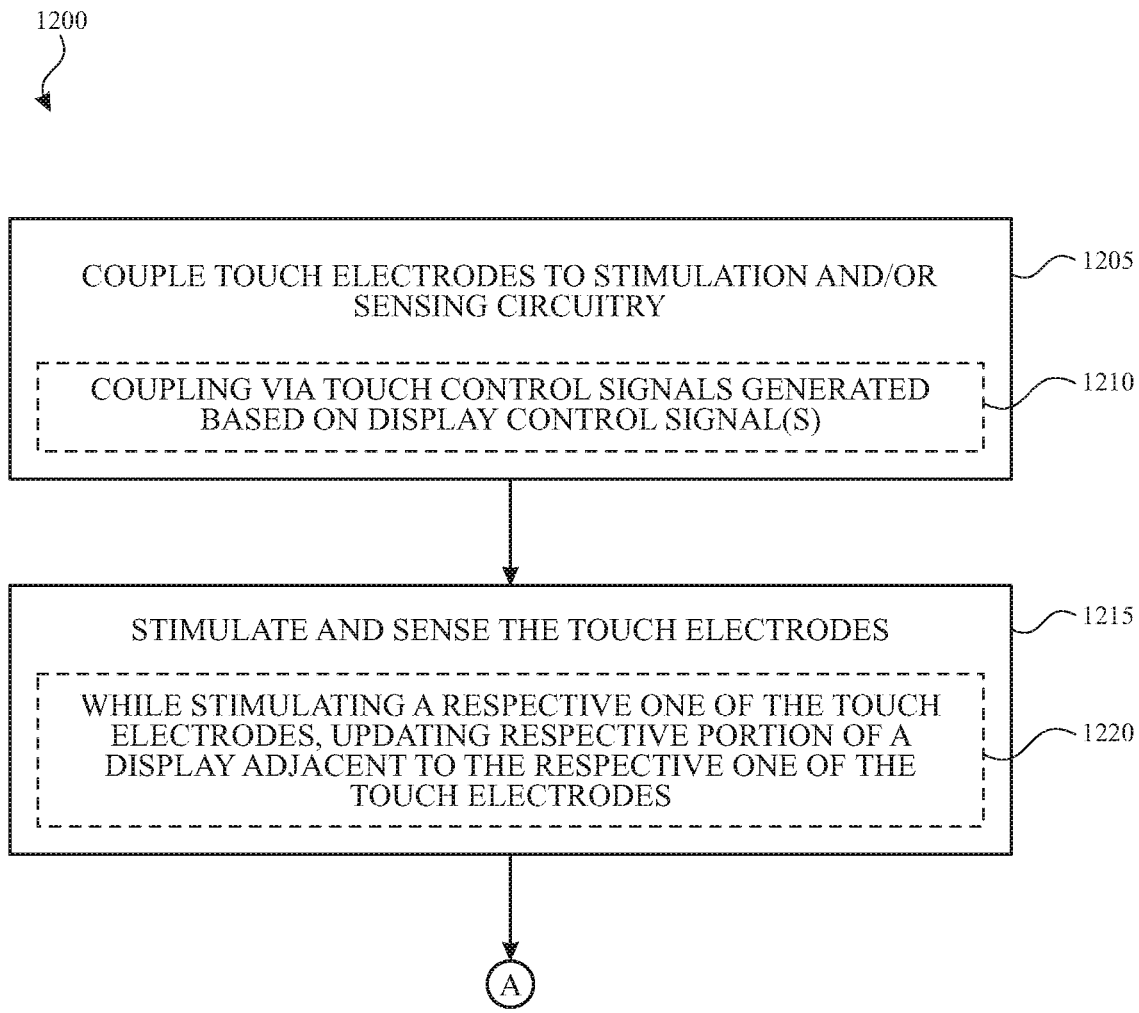
FIGS. 12A-12B illustrate an example process for operating a touch screen with perimeter touch electrodes according to examples of the disclosure.
Figure 12B:
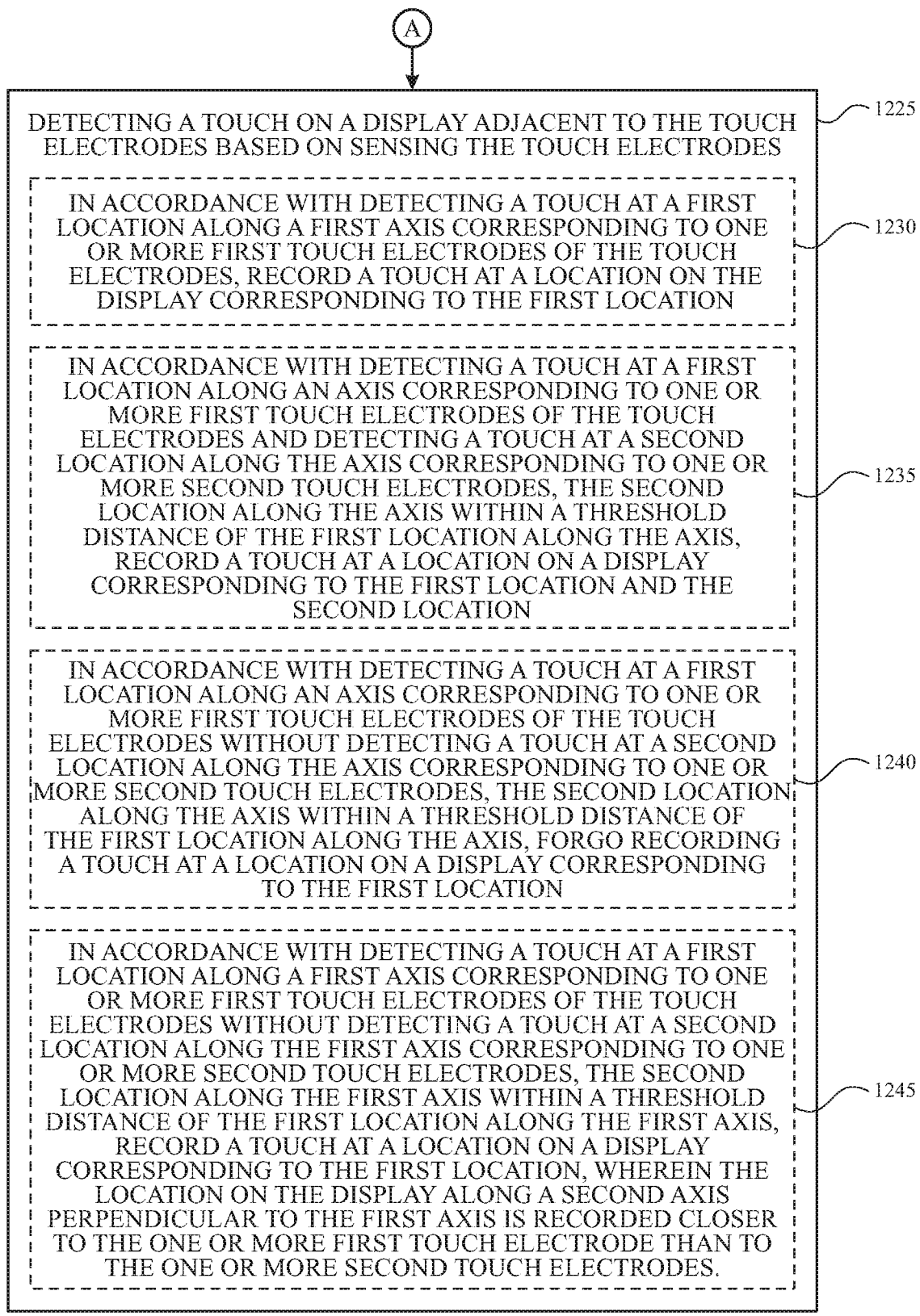

FIGS. 12A-12B illustrate an example process 1200 for operating a touch screen with perimeter touch electrodes according to examples of the disclosure. At 1205, the touch screen can couple perimeter touch electrodes to stimulation and/or sensing circuitry. For example, as described with respect to FIGS. 7-8 one or more perimeter touch electrodes can be coupled to one or more stimulation electrodes. The one or more stimulation electrodes can be coupled to the one or more sensing circuits. The capacitances of the touch electrodes can be sensed in one or more scan steps. At 1210, in some examples, the coupled can be achieved by switching circuitry controlled by control signals generated based on display control signals. For example, as described above with respect to FIG. 9, the display control signals (e.g., gate enable signals) can be used to control the coupling (and decoupling) of perimeter touch electrodes. At 1215, the touch screen can stimulate and sense a capacitance at the touch electrodes. In some example, the self-capacitance of each of the touch electrodes can be measured in one or more scan steps. In some examples, at 1220, while stimulating/sensing the touch electrodes, the display control signals can also be used to update corresponding portions of the display. In some examples, the control signals can be multiplexed between time and display (e.g., to reduce interference between touch and display operations).

At 1225, the touch screen can detect a touch on the display adjacent to one or more perimeter touch electrodes based on the sensed capacitances at the one or more perimeter touch electrodes. In some examples, in accordance with detecting a touch at a first location along a first axis corresponding to one or more first touch electrodes, the touch screen can record a touch at a location on the display corresponding to the first location (1230). In some examples, in accordance with detecting a touch at a first location along an axis corresponding to one or more first touch electrodes and detecting a touch at a second location along the axis corresponding to one or more second touch electrodes (the second location along the axis, within a threshold distance of the first location along the axis), the touch screen can record a touch at a location on a display corresponding to the first location and the second location (1235). In some examples, in accordance with detecting a touch at a first location along an axis corresponding to one or more first touch electrodes without detecting a touch at a second location along the axis corresponding to one or more second touch electrodes (the second location along the axis, within a threshold distance of the first location along the axis), the touch screen can forgo recording a touch at a location on a display corresponding to the first location (1240). In some examples, in accordance with detecting a touch at a first location along a first axis corresponding to one or more first touch electrodes without detecting a touch at a second location along the first axis corresponding to one or more second touch electrodes (the second location along the first axis, within a threshold distance of the first location along the first axis), the touch screen can record a touch at a location on a display corresponding to the first location (1245). The location on the display along a second axis perpendicular to the first axis can be recorded closer to the one or more first touch electrode than to the one or more second touch electrodes.

Therefore, according to the above, some examples of the disclosure are directed to an electronic device. The electronic device can comprise a base assembly including a keyboard and a touch component. The touch screen can include a display having a display area; perimeter touch electrodes formed outside the display area; touch sensing circuitry configured to sense capacitances at the perimeter touch electrodes; and processing circuitry configured to detect a touch on a region of the display of the touch component based on detecting a touch at one or more first perimeter touch electrodes adjacent to the region of the display using the sensed capacitances. Additionally or alternatively to one or more of the examples disclosed above, in some examples, the perimeter touch electrodes can comprise frit metal arranged around the perimeter of the display. Additionally or alternatively to one or more of the examples disclosed above, in some examples, the frit metal can be disposed between a substrate supporting display pixels and an encapsulation layer. Additionally or alternatively to one or more of the examples disclosed above, in some examples, the aspect ratio of the display can be greater than 5:1. Additionally or alternatively to one or more of the examples disclosed above, in some examples, the touch screen aspect ratio can be greater than 10:1. Additionally or alternatively to one or more of the examples disclosed above, in some examples, the perimeter touch electrodes can comprise a first one-dimensional array of first touch electrodes disposed on a first side of display and a second one-dimensional array of second touch electrodes disposed on a second side of the display, opposite the first side of the display. Additionally or alternatively to one or more of the examples disclosed above, in some examples, the touch sensing circuitry can be configured to sense a self-capacitance measurement or a mutual capacitance measurement for the perimeter touch electrodes. Additionally or alternatively to one or more of the examples disclosed above, in some examples, the touch sensing circuitry can further include: a first stimulation electrode; and switching circuitry configurable to couple one or more of the perimeter touch electrodes to the first stimulation electrode. Additionally or alternatively to one or more of the examples disclosed above, in some examples, the touch sensing circuitry can further include: a second stimulation electrode. The switching circuitry can be further configurable to couple the one or more of the perimeter touch electrodes to the second stimulation electrode. Additionally or alternatively to one or more of the examples disclosed above, in some examples, the touch sensing circuitry can further include drive circuitry configured to generate a first stimulation signal and a second stimulation signal, different from the first stimulation signal. Additionally or alternatively to one or more of the examples disclosed above, in some examples, the first stimulation electrode can be coupled to a first touch sensing circuit and the second stimulation electrode can be coupled to a second touch sensing circuit. Additionally or alternatively to one or more of the examples disclosed above, in some examples, the touch sensing circuitry can be configured to couple, at least partially simultaneously, a first of the perimeter touch electrodes to the first stimulation electrode and couple a second of the perimeter touch electrodes to the second stimulation electrode. The touch sensing circuitry can be configured to sense, at least partially simultaneously, the first of the perimeter touch electrodes and the second of the perimeter touch electrodes. Additionally or alternatively to one or more of the examples disclosed above, in some examples, the switching circuitry can couple the one or more of the perimeter touch electrodes to the first stimulation electrode in response to one or more switch control signals. Additionally or alternatively to one or more of the examples disclosed above, in some examples, the one or more switch control signals can be generated based on one or more display control signals. Additionally or alternatively to one or more of the examples disclosed above, in some examples, the touch component can be configured to sense capacitances at the one or more first perimeter touch electrodes adjacent to the region of the display at least partially concurrently with updating display pixels in the region of the display. Additionally or alternatively to one or more of the examples disclosed above, in some examples, the touch component can further comprise a touch and display controller coupled to the display and the perimeter touch electrodes via a flex circuit. Additionally or alternatively to one or more of the examples disclosed above, in some examples, the touch sensing circuitry can further include: a stimulation electrode; drive circuitry coupled to the stimulation electrode and configured to generate a stimulation signal; and touch sensing circuits coupled to the perimeter touch electrodes and configured to measure a mutual capacitance between the stimulation electrode and each of the perimeter touch electrodes. Additionally or alternatively to one or more of the examples disclosed above, in some examples, the electronic device can further comprise a display assembly including a second display, the display assembly pivotably coupled to the base assembly.

Some examples of the disclosure are directed to a method. The method can comprise: at an electronic device including a display and perimeter touch electrodes formed outside a display area of the display: coupling the perimeter touch electrodes to sensing circuitry; sensing the perimeter touch electrodes; and detecting a touch on the display based on sensing the perimeter touch electrodes. Additionally or alternatively to one or more of the examples disclosed above, in some examples, coupling the perimeter touch electrodes to the sensing circuitry can comprise: coupling via one or more touch control signals generated based on one or more display control signals. Additionally or alternatively to one or more of the examples disclosed above, in some examples, coupling the perimeter touch electrodes to the sensing circuitry can comprise: coupling each of the perimeter touch electrodes to the sensing circuitry, such that only one of the perimeter touch electrodes is coupled to the sensing circuitry at a time. Additionally or alternatively to one or more of the examples disclosed above, in some examples, sensing the perimeter touch electrodes can comprise: stimulating a respective one of the perimeter touch electrodes; and while stimulating the respective one of the perimeter touch electrodes, updating a respective portion of the display adjacent to the respective one of the perimeter touch electrodes. Additionally or alternatively to one or more of the examples disclosed above, in some examples, detecting the touch on the display based on sensing the perimeter touch electrodes can comprise: in accordance with detecting a touch at a first location along a first axis corresponding to one or more first perimeter touch electrodes of the touch electrodes, recording the touch at a location on the display corresponding to the first location. Additionally or alternatively to one or more of the examples disclosed above, in some examples, detecting the touch on the display based on sensing the perimeter touch electrodes can comprise: in accordance with detecting a touch at a first location along an axis corresponding to one or more first perimeter touch electrodes of the touch electrodes and detecting a touch at a second location along the axis corresponding to one or more second perimeter touch electrodes, the second location along the axis within a threshold distance of the first location along the axis, recording the touch at a location on the display corresponding to the first location and the second location. Additionally or alternatively to one or more of the examples disclosed above, in some examples, detecting the touch on the display based on sensing the perimeter touch electrodes can comprise: in accordance with detecting a touch at a first location along an axis corresponding to one or more first perimeter touch electrodes of the touch electrodes without detecting a touch at a second location along the axis corresponding to one or more second perimeter touch electrodes, the second location along the axis within a threshold distance of the first location along the axis, forgoing recording the touch at a location on the display corresponding to the first location. Additionally or alternatively to one or more of the examples disclosed above, in some examples, detecting the touch on the display based on sensing the perimeter touch electrodes can comprise: in accordance with detecting a touch at a first location along a first axis corresponding to one or more first perimeter touch electrodes of the touch electrodes without detecting a touch at a second location along the first axis corresponding to one or more second perimeter touch electrodes, the second location along the first axis within a threshold distance of the first location along the first axis, recording the touch at a location on the display corresponding to the first location, wherein the location on the display along a second axis perpendicular to the first axis is recorded closer to the one or more first perimeter touch electrode than to the one or more second perimeter touch electrodes. Additionally or alternatively to one or more of the examples disclosed above, in some examples a non-transitory computer readable storage medium stores instructions that when executed by an electronic device, cause the electronic device to perform the method of one or more of the examples disclosed above. Additionally or alternatively to one or more of the examples disclosed above, in some examples an electronic device can be configured to perform the method of one or more of the examples disclosed above.

Some examples of the disclosure are directed to an electronic device. The electronic device can comprise a display assembly including a first display and a base assembly. The base assembly can be pivotably coupled to the display assembly. The base assembly can include: an input device (e.g., a keyboard, a touch pad, etc.) and a touch component. The touch component can include a second display, a perimeter touch electrode formed outside the display area, touch sensing circuitry configured to sense a capacitance at the perimeter touch electrode, and processing circuitry configured to detect a touch on a region of the second display of the touch component based on a sensed capacitance at the perimeter touch electrode adjacent to the region of the second display. The base assembly can also include an energy storage device (e.g., a battery) and/or (wired or wireless) communication circuitry. The display assembly can include a second display. Additionally or alternatively to one or more of the examples disclosed above, in some examples the perimeter touch electrode can comprises frit metal arranged around at least a portion of a perimeter of the second display. Additionally or alternatively to one or more of the examples disclosed above, in some examples the frit metal can be disposed between a substrate supporting display pixels of the second display and an encapsulation layer of the second display.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device comprising:
  a base assembly including:
    a keyboard; and
    a touch component including:
      a display having a display area;
      a plurality of perimeter touch electrodes formed outside and not overlapping with the display area;
      touch sensing circuitry configured to sense capacitances at the plurality of perimeter touch electrodes; and processing circuitry configured to detect a touch on a region of the display of the touch component based on detecting a first touch corresponding to a first location of the display at one or more first perimeter touch electrodes of the plurality of perimeter touch electrodes adjacent to the region of the display using the sensed capacitances, and based on detecting a second touch corresponding to a second location of the display, different from the first touch corresponding to the first location, at one or more second perimeter touch electrodes, different from the one or more first perimeter touch electrodes, wherein a location of the touch on the region of the display is based on the first location and the second location.

2. The electronic device of claim 1, wherein the plurality of perimeter touch electrodes comprises frit metal arranged around the perimeter of the display.

3. The electronic device of claim 2, wherein the frit metal is disposed between a substrate supporting display pixels and an encapsulation layer.

4. The electronic device of claim 1, wherein an aspect ratio of the display is greater than 5:1.

5. The electronic device of claim 1, wherein the plurality of perimeter touch electrodes comprises a first one-dimensional array of first touch electrodes disposed on a first side of the display and a second one-dimensional array of second touch electrodes disposed on a second side of the display, opposite the first side of the display.

6. The electronic device of claim 5, wherein the processing circuitry is configured to detect the first touch at the one or more first perimeter touch electrodes corresponding to the first one-dimensional array of first touch electrodes and detecting the second touch at one or more second perimeter touch electrodes of the plurality of perimeter touch electrodes corresponding to the second one-dimensional array of second touch electrodes.

7. The electronic device of claim 1, wherein the touch sensing circuitry further includes:
 a first stimulation electrode; and
 switching circuitry configurable to couple one or more of the plurality of perimeter touch electrodes to the first stimulation electrode.

8. The electronic device of claim 7, wherein the touch sensing circuitry further includes:
 a second stimulation electrode;
 wherein the switching circuitry is further configurable to couple the one or more of the plurality of perimeter touch electrodes to the second stimulation electrode.

9. The electronic device of claim 8, wherein the touch sensing circuitry is configured to couple, at least partially simultaneously, a first of the perimeter touch electrodes of the plurality of perimeter touch electrodes to the first stimulation electrode and couple a second of the perimeter touch electrodes of the plurality of perimeter touch electrodes to the second stimulation electrode; and
 wherein the touch sensing circuitry is configured to sense, at least partially simultaneously, the first of the perimeter touch electrodes and the second of the perimeter touch electrodes.

10. The electronic device of claim 7, wherein the switching circuitry couples the one or more of the perimeter touch electrodes of the plurality of perimeter touch electrodes to the first stimulation electrode in response to one or more switch control signals.

11. The electronic device of claim 1, wherein the touch component is configured to sense self-capacitances at the one or more first perimeter touch electrodes of the plurality of perimeter touch electrodes adjacent to the region of the display at least partially concurrently with updating display pixels in the region of the display.

12. The electronic device of claim 1, the touch component further comprising:
 a touch and display controller coupled to the display and the plurality of perimeter touch electrodes via a flex circuit.

13. The electronic device of claim 1, further comprising:
 a display assembly including a second display, the display assembly pivotably coupled to the base assembly.

14. An electronic device comprising:
 a display assembly including a first display;
 a base assembly pivotably coupled to the display assembly and including:
  an energy storage device;
  communication circuitry;
  a keyboard; and
  a touch component including:
   a second display having a display area;
   a plurality of perimeter touch electrodes formed outside and not overlapping with the display area;
   touch sensing circuitry configured to sense capacitances at the plurality of perimeter touch electrodes; and
   processing circuitry configured to detect a touch on a region of the second display of the touch component based on detecting a first touch corresponding to a first location of the second display at one or more first perimeter touch electrodes of the plurality of perimeter touch electrodes adjacent to the region of the second display using the sensed capacitances, and based on detecting a second touch corresponding to a second location of the second display, different from the first touch corresponding to the first location, at one or more second perimeter touch electrodes, different from the one or more first perimeter touch electrodes, wherein a location of the touch on the region of the second display is based on the first location and the second location.

15. The electronic device of claim 14, wherein the plurality of perimeter touch electrodes comprises frit metal arranged around at least a portion of a perimeter of the second display and disposed between a substrate supporting display pixels of the second display and an encapsulation layer of the second display.

16. A method comprising:
 at an electronic device comprising a base assembly including a keyboard and a touch component including a display having a display area, a plurality of perimeter touch electrodes formed outside and not overlapping with the display area, touch sensing circuitry and processing circuitry:
  coupling the plurality of perimeter touch electrodes to the touch sensing circuitry;
  sensing capacitances at the plurality of perimeter touch electrodes using the touch sensing circuitry; and
  detecting a touch on a region of the display of the touch component using the processing circuitry based on detecting a first touch corresponding to a first location of the display at one or more first perimeter touch electrodes of the plurality of perimeter touch electrodes adjacent to the region of the display using the sensed capacitances, and based on detecting a second touch corresponding to a second location of the display, different from the first touch corresponding to the first location, at one or more second perimeter touch electrodes, different from the one or more first perimeter touch electrodes, wherein a location of the touch on the region of the display is based on the first location and the second location.

17. The method of claim 16, wherein coupling the plurality of perimeter touch electrodes to the sensing circuitry comprises:
coupling via one or more touch control signals generated based on one or more display control signals.

18. The method of claim 16, wherein sensing the plurality of perimeter touch electrodes comprises:
stimulating a respective one of the plurality of perimeter touch electrodes; and
while stimulating the respective one of the plurality of perimeter touch electrodes, updating a respective portion of the display adjacent to the respective one of the plurality of perimeter touch electrodes.

19. The method of claim 16, wherein detecting the touch on the region of the display based on detecting the touch at the one or more first perimeter touch electrodes of the plurality of perimeter touch electrodes comprises:
in accordance with detecting a touch at a first location along a first axis corresponding to the one or more first perimeter touch electrodes of the plurality of perimeter touch electrodes, recording the touch at a location on the display corresponding to the first location.

20. The method of claim 16, wherein detecting the touch on the region of the display based on detecting the touch at the one or more first perimeter touch electrodes of the plurality of perimeter touch electrodes comprises:
in accordance with detecting a touch at a first location along an axis corresponding to the one or more first perimeter touch electrodes of the plurality of perimeter touch electrodes and detecting a touch at a second location along the axis corresponding to one or more second perimeter touch electrodes of the plurality of perimeter touch electrodes, the second location along the axis within a threshold distance of the first location along the axis, recording the touch at a location on the display corresponding to the first location and the second location.

21. The method of claim 16, wherein detecting the touch on the region of the display based on detecting the touch at the one or more first perimeter touch electrodes of the plurality of perimeter touch electrodes comprises:
in accordance with detecting a touch at a first location along an axis corresponding to the one or more first perimeter touch electrodes of the plurality of perimeter touch electrodes without detecting a touch at a second location along the axis corresponding to one or more second perimeter touch electrodes of the plurality of perimeter touch electrodes, the second location along the axis within a threshold distance of the first location along the axis, forgoing recording the touch at a location on the display corresponding to the first location.

* * * * *